US012776335B2

(12) United States Patent
Nadar et al.

(10) Patent No.: US 12,776,335 B2
(45) Date of Patent: Oct. 27, 2026

(54) SYSTEMS AND METHODS FOR REAL-TIME THREAT DETECTION

(71) Applicant: Comcast Cable Communications, LLC, Philadelphia, PA (US)

(72) Inventors: Balaji Nadar, Chennai (IN); Ganesh Narayanan, Chennai (IN); Sandhya Baskaran, Chennai (IN)

(73) Assignee: Comcast Cable Communications, LLC, Philadelphia, PA (US)

( * ) Notice: Subject to any disclaimer, the term of this patent is extended or adjusted under 35 U.S.C. 154(b) by 133 days.

(21) Appl. No.: 18/813,374

(22) Filed: Aug. 23, 2024

(65) Prior Publication Data

US 2026/0057898 A1 Feb. 26, 2026

(51) Int. Cl.

| | |
|---|---|
| ***G10L 25/51*** | (2013.01) |
| ***G08B 7/06*** | (2006.01) |
| ***G10L 15/08*** | (2006.01) |

(52) U.S. Cl.

CPC ................ *G10L 25/51* (2013.01); *G08B 7/06* (2013.01); *G10L 15/08* (2013.01); *G10L 2015/088* (2013.01)

(58) Field of Classification Search

CPC ... G10L 25/51; G10L 15/08; G10L 2015/088; G08B 7/06

See application file for complete search history.

(56) References Cited

U.S. PATENT DOCUMENTS

| | | | | |
|---|---|---|---|---|
| 2021/0193174 | A1* | 6/2021 | Enzinger | G10L 17/00 |
| 2024/0195904 | A1* | 6/2024 | Min | H04M 1/654 |
| 2024/0275881 | A1* | 8/2024 | Critzer | G10L 25/51 |
| 2024/0363099 | A1* | 10/2024 | Altaf | G10L 15/02 |
| 2026/0031090 | A1* | 1/2026 | Bishop | G10L 17/12 |

* cited by examiner

*Primary Examiner* — Bhavesh M Mehta

*Assistant Examiner* — Jangwoen Lee

(74) *Attorney, Agent, or Firm* — Smith, Gambrell & Russell LLP

(57) ABSTRACT

Methods may include receiving, via a computing device associated with a first user, audio data indicative of at least audible speech of a second user and ambient noise. The ambient noise may comprise ambient audible speech. The method may include determining, based on a comparison of the audible speech of the second user and the ambient audible speech, that a threat threshold has been satisfied. The method may include outputting, based on the determination that the threat threshold has been satisfied, an indication of malicious activity.

28 Claims, 17 Drawing Sheets

400

| | | | | |
|---|---|---|---|---|
| Conversation 1 | ***urge*** | ***you*** | ***to*** | ***update*** |
| Conversation 2 | provide | the | information | right |
| Conversation 3 | ***you*** | ***to*** | ***update*** | account |
| Conversation 4 | we | ***urge*** | ***you*** | ***to*** |

Figure 4

500

| Col 1 | Col 2 | Col 3 | Col 4 | Col 5 | Col 6 | Col 7 | Col 8 | Col 9 |
|---|---|---|---|---|---|---|---|---|
| Call | Caller decibel rate over x minutes | Receiver decibel rate over x minutes | Personal Identifier Keywords | Receiver Acknowledgement of the "Caller" | Offer Keywords | Friendly/ empathetic Keywords | Callers Summary Correlation | Is Vishing? |
| Call 1 | 15 | 1 | 12 | yes | 2 | 10 | 0 | yes |
| Call 2 | 2 | 1 | 2 | yes | 0 | 2 | 1 | no |

Figure 5

SYSTEMS AND METHODS FOR REAL-TIME THREAT DETECTION

BACKGROUND

Voice phishing ("vishing") attacks may include vocal attempts to steal personal information, such as in-person or over a voice call or communication. As an example, a threat actor may call or otherwise audibly engage a potential victim to solicit personal information. Currently, there are limited or no defense mechanisms against vishing attacks outside of the awareness of the potential victim. Improvements are needed.

SUMMARY

It is to be understood that both the following general description and the following detailed description are exemplary and explanatory only and are not restrictive. Methods and systems for managing wireless communications are described.

A system of one or more devices such as computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by a data processing apparatus, cause the apparatus to perform the actions.

Methods may include receiving, via a computing device associated with a first user, audio data indicative of at least audible speech of a second user (e.g., threat actor) and ambient noise. The ambient noise may comprise ambient audible speech. The method may include determining, based on a comparison of the audible speech of the second user and the ambient audible speech, that a threat threshold has been satisfied. The method may include outputting an indication of malicious activity based on the determination that the threat threshold has been satisfied. Other aspects may include corresponding computer systems, apparatus, and computer programs recorded on one or more computer storage devices, each configured to perform the actions of the methods.

Methods may include receiving, via a computing device associated with a first user, audio data indicative of at least audible speech of a second user (e.g., threat actor) and ambient noise. The ambient noise may comprise ambient audible speech. The method may include determining, based on at least the audible speech of the second user, the ambient audible speech, and a threat pattern recognition, that a threat threshold has been satisfied. The method may include causing a corrective action based on determining that the threat threshold has been satisfied. Other aspects may include corresponding computer systems, apparatus, and computer programs recorded on one or more computer storage devices, each configured to perform the actions of the methods.

Methods may include receiving, via a computing device associated with a first user, audio data indicative of at least audible speech of a second user (e.g., threat actor) and ambient noise. The ambient noise may comprise ambient audible speech. The method may include determining, based on a comparison of the audible speech of the second user and the ambient audible speech, that a threat threshold has been satisfied by at least a first aspect of the audio data. The method may include using at least a second aspect of the audio data to update the threat threshold. Other aspects may include corresponding computer systems, apparatus, and computer programs recorded on one or more computer storage devices, each configured to perform the actions of the methods.

This summary is not intended to identify critical or essential features of the disclosure, but merely to summarize certain features and variations thereof. Other details and features will be described in the sections that follow.

BRIEF DESCRIPTION OF THE DRAWINGS

Some features are shown by way of example, and not by limitation, in the accompanying drawings. In the drawings, like numerals reference similar elements.

FIG. 4 shows a visual representation of an example ambience checker analyzing background conversations.

FIG. 5 shows a visual representation of an example information stepper analyzing calls.

Figure 1:
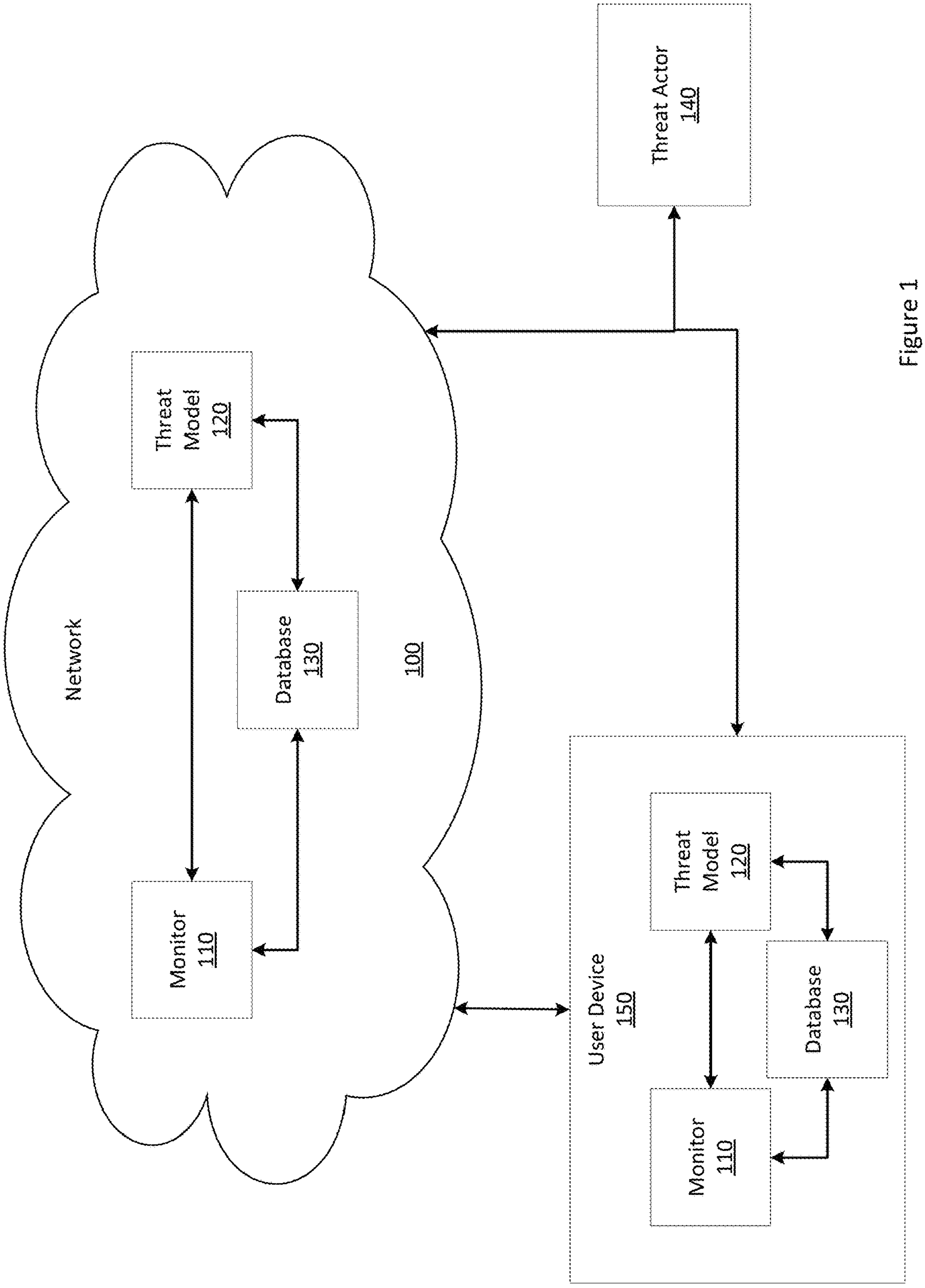
FIG. 1 shows an example environment for real-time threat detection.

The accompanying drawings show examples of the disclosure. It is to be understood that the examples shown in the drawings and/or discussed herein are non-exclusive and that there are other examples of how the disclosure may be practiced.

DETAILED DESCRIPTION

The present disclosure relates to systems and methods for detecting threats such as vishing threats, for example. Often, threat actors target vulnerable victims that are unaware of vishing threats. Current approaches directed to addressing phishing or text messaging attacks (e.g., SMShing) include sending a notification via the same method as the attack (e.g., e-mail or short messaging service (SMS) messaging). Such approaches require a user to see and understand the notification prior to engagement with the phishing and SMShing attacks. Moreover, such approaches are particularly ill-suited to handle vishing, in which a user is engaged on a phone call or in-person encounter, which may require immediate warning to mitigate the disclosure of sensitive information.

As an illustrative example, a user may receive a call via a user device. The call may be from a threat actor as part of a vishing (voice phishing) attack. The user device may be configured to continuously record or receive audible speech on the call. In accordance with an aspect of the present disclosure, the voice call may be monitored by logic such as software. Other mechanisms may be used. As an example, logic may be operatively disposed on the user device or another device associated with the user such as a cell phone, smart device, personal computer, or other configured device.

Additionally or alternatively, the logic may be operatively disposed on network equipment, such as one or more components of a communications network. As such, the logic may be configured to receive audio data indicative of the audible speech over a voice call. The logic may compare the audio data with patterns associated with threat calls and/or non-threat calls. Patterns associated with threat calls and/or non-threat calls may include detecting background conversations that seem to have the same script, a use of words connoting urgency, a request for sensitive information, etc., as described herein. If the logic determines that the call is likely a threat call, then corrective action may be implemented as an attempt to alert and/or protect the user.

Corrective action may comprise noise and sensitive information cancellation, distracting flashlight or light pulses, push notifications, tactile feedback or vibration, audible alarms, etc. As a further example, corrective action may comprise the use of inverse linear predictive coding (LPC) filtering or exemplary amplification or introduction of high frequency noises in between the conversation. As an illustrative example, the audio data may be processed to generate an inverse audio signal. As a further example, the audio data may represent audio having a signal waveform, and the inverse audio signal may be at least partial inverse of the base signal waveform. As such, processing of an inverse audio and overlaying the inverse audio with the original audio data may "nullify" or interfere with the ability to receive or make use of the audio data. Such corrective action may be delivered on a physical mode if the detected threat actor is in person. Corrective action may be delivered on an existing conversation line (e.g., via a communication network) using a combination of dual-tone multi-frequency (DTMF) signaling tones. Other corrective action may be used to interrupt the threat.

A user device associated with a user may have an application (e.g., hardware, software, learning model, etc.) to monitor in-person conversations. As an example, the user device may comprise a handheld or wearable device comprising one or more of a camera, a microphone, or audio speaker. The user device may be a custom device configured for threat detection or may be an existing user device configured with hardware or software modifications to effect the methods described herein. As an illustration, a microphone of the user device may receive audio data indicative of conversations occurring in-person or over a voice call. The application may determine a portion of the received audio data is associated with the user of the device, for example, by proximity to the microphone, by matching a portion of the received audio data to a speech signature associated with the user, or other methods. Additionally, or alternatively, a portion of the audio data may be determined to be associated with a non-user speaker, who may be a threat actor. As such, an in-person conversation including audible speech may be monitored for attempts to collect personal data, or vishing, as described herein. If the application determines that the conversation is an attempt to acquire personal or sensitive information, attempts to alert and/or protect the user may be made. As a further example, the analysis and partitioning of the audio data may be based on a trained model or software configured to receive the audio data and to determine which portions of the audio data are associated with a first user or a second user. As such, the portions of the audio data may be segmented or tagged to be associated with specific users for further processing. Various models may be used to effect this segmentation. As an illustrative example, a model may be trained on a data set including non-threat and/or threat calls such that patterns and features in the conversations may be learned and identified using the model.

As an illustrative example, a model such as a learning model or a machine learning (ML) model may be used to determine if a call is consistent with a threat such as a vishing attempt. As an example, conversation between a user and a possible "threat actor" may be analyzed (e.g., in real time, continuously analyzed, etc.). Such analysis may be based on the model, which may comprise pattern recognition engine as a service. Other analysis may be used. As a further example, a database may comprise various training data and may comprise known threat patterns from which the model may be trained.

Various aspects of a voice call may be extracted for analysis such as changes in pauses and speech speed, detection of particular words, detection of certain ambient speech, changes in speech, and other aspects such as patterns, volume, and speech dynamics. Such analysis may predict whether there is a need for an immediate response or whether continued analysis is warranted. When a pattern indicating a threat such as a vishing attempt is detected the aspect of the call may be used as feedback training and may be specifically monitored in future calls. Moreover, any information from monitored calls may be used as feedback for additional training of the model.

As described herein, the terms caller and caller recipient are often used to refer to a victim (e.g., user, call recipient) and a threat actor (e.g., caller). However, the terms are used to designate two separate users and are not intended to be limiting with regard to the user who initiated the call. In some instances, a threat actor may initiate a call, for example, from a call center. However, in other instances, the victim user may be prompted to initiate a call, for example from a phishing e-mail or other prompt. Moreover, the term call may reference a face-to-face encounter between the victim user and the threat actor. Such terms are not intended to limit the role or function of the present disclosure.

FIG. 1 shows an example environment for real-time threat detection (e.g., vishing detection). The environment comprises a network 100, a threat actor 140 (e.g., one or more users, callers, call recipients, etc.), and a user device 150, which may be associated with a potential threat victim. The threat actor 140 and the user device 150 may be in communication via the network 100. The network 100 may be or comprise any communication network or communication channel. The network 100 may facilitate an exchange of audio data between two connected parties. The audio data may be indicative of an audible speech transmitted over the communication network. As an example, the network may be or comprise a voice call network such as a telephone network, cellular network, Internet, or the like. The network 100 may comprise one or more public portions. The network 100 may comprise one or more private portions. Other channels or networks may be used. As an example, the threat actor 140 may be face-to-face with a user and may conduct the conversation "in person". As such, the same principles described herein over a network communication may be applied to an in-person conversation.

The threat actor 140 may be, comprise, or be associated with a device configured to effect a voice call. As an example, the threat actor 140 may be associated with or may comprise a computer, a mobile device, a cellular phone, a smart device, a tablet, or the like. The threat actor 140 may be disposed in a call center comprising a plurality of threat actors. As such, an ambient noise of the call center may be indicative of a threat, and may be used as threat detection, as described herein. The ambient noise may comprise ambient audible speech. The threat actor 140 may comprise multiple threat actors operating in a same location. The threat actor 140 may comprise multiple threat actors reading from a same script. The threat actor 140 may comprise multiple threat actors speaking multiple languages.

The user device 150 may be, comprise, or be associated with a device configured to effect a voice call. As an example, the user device 150 may be associated with or may comprise a computer, a mobile device, a cellular phone, a smart device, a tablet, or the like. As an example, the user device 150 may comprise a handheld or wearable device comprising one or more of a camera, an audio speaker, or a microphone. The user device 150 may be a custom device comprising hardware and/or software configured for threat detection and remediation of threats. The user device 150 may be an existing user device configured with hardware or software modifications to effect the methods described herein.

The network 100 may comprise a monitor 110, a threat model 120, and a database 130. Although shown in the network 100, various elements, such as the monitor 110, the Model, and/or the database 130, may be operatively disposed in the user device 150.

The monitor 110 may comprise hardware and/or software configured to receive and/or record audio data exchanged between the threat actor 140 and the user device 150. The monitor 110 may be configured to analyze the audio data to determine whether a threat is detected or whether corrective action should be implemented. The monitor 110 may be configured to perform such analysis based on the threat model 120. The monitor 110 may extract caller audio data and/or call recipient audio data from the audio data to create party specific audio data. The monitor 110 may partition the audio data into segments. The monitor 110 may apply a sliding window to the segments to analyze the audio data. The monitor 110 may extract information from the audio data and cause the extracted information to be stored in the database 130. The monitor 110 may cause the threat model 120 to be trained and/or fine-tuned and/or updated using information stored in the database 130. The monitor 110 may take corrective action on determining that a threat (e.g., vishing attack) is happening or has been detected between the threat actor 140 and the user associated with the user device 150. The monitor 110 may interact with an application executing on the user device 150. Although shown in the network 100, the monitor 110 may be operatively disposed on the user device 150. The monitor 110 may perform methods and processes described herein, such as process 800, process 900, and process 1000.

The threat model 120 may be or comprise a machine learning model. The threat model 120 may be or comprise a set of rules and functions configured to be trained for certain pattern recognition. The threat model 120 may be trained, fine-tuned, updated, etc. with data from the database 130. The threat model 120 may be trained on behavioral changes over a course of a conversation to classify an input conversation as likely vishing or normal based on behavioral changes in the input conversation. The threat model 120 may be trained to detect a probability of a certain threat.

The threat model 120 may comprise a confidence stepper. The threat model 120 may assign a threat value to audio data based, at least in part, on the confidence stepper. The confidence stepper may be based on one or more of duration of pauses in the audible speech of the caller, an increase or decrease in a length of pauses in the audible speech of the caller, a number of words spoken in a confidence time window, an increase or decrease in the number of words spoken in a confidence time window, filler utterances in the audible speech of the caller, etc. The confidence stepper may comprise a sliding confidence time window configured to be adjusted based on at least a comparison of the audio data to a comparative data set. The comparative data set, at least in part, may comprise stored in the database 130. The comparative data set, at least in part, may comprise data extracted from previous audio data. At least a portion of the previous audio data may be from calls deemed to be vishing attacks. At least a portion of the previous audio data may be from calls deemed not to be vishing attacks. Comparative data sets may be accessed from various data sources including specifically relevant data sources and generic data source. Data maybe be pre-processed in order to improve the training, testing, or application of the data, as described herein.

The confidence stepper may comprise a measurement of the caller's tone. The confidence stepper may comprise a measurement of a change of the caller's tone. The confidence stepper may detect an increase and/or decrease in a length of pauses and compare the length of pauses to a duration of pauses in a baseline call, such as a normal conversation and/or a confirmed vishing attack. The confidence stepper may detect an increase and/or decrease in changes in speed of speech and compare the speed of speech to a speed of speech in a baseline call, such as a normal conversation and/or a confirmed vishing attack. The confidence stepper may detect a number of filler utterances and compare the number to a number of filler utterances in a baseline call, such as a normal conversation and/or a confirmed vishing attack. A sliding window may be applied to the confidence stepper, which will be described in reference to FIGS. 2 and 3.

The threat model 120 may comprise an ambience checker. The threat model 120 may assign a threat value to audio data based, at least in part, on the ambience checker. The ambience checker may be configured to detect ambient information from the audio data and compare the ambient information to a comparative data set. Ambient information may comprise ambient audible speech. The comparative data set may comprise data with a presence and/or absence of ambient items of interest. Ambient items of interest may comprise multiple similar background conversations, background conversations in multiple languages, etc. The comparative data set, at least in part, may comprise stored in the database 130. The comparative data set, at least in part, may comprise data extracted from previous audio data. At least a portion of the previous audio data may be from calls deemed to be vishing attacks. At least a portion of the previous audio data may be from calls deemed not to be vishing attacks.

The threat model 120 may comprise an information flow stepper. The threat model 120 may assign a threat value to audio data based, at least in part, on the information flow stepper. The information flow stepper may be based on one or more of decibel changes over time of the audible speech of the caller, decibel changes over time of audible speech of a receiver, detection of personal identifier keyword, detection of mimic identifier, detection of promotion keyword, detection of empathy keywords, correlation between prior statement and current statement of the caller, etc. The information flow stepper may be based on at least a comparison of the audio data to a comparative data set. The comparative data set, at least in part, may comprise stored in the database 130. The comparative data set, at least in part, may comprise data extracted from previous audio data. At least a portion of the previous audio data may be from calls deemed to be vishing attacks. At least a portion of the previous audio data may be from calls deemed not to be vishing attacks.

The threat model 120 may assign weights to various factors. For example, the threat model 120 may determine that a call has a threshold number of requests for personal identifier information (e.g., a factor favoring classifying the call as a vishing attack), but also that the call does not have a threshold number of filler utterances (e.g., a factor against classifying the call as a vishing attack). The determination that the call has the threshold number of requests for personal identifier information may weigh more heavily than the determination that the call does not have the threshold number of filler utterances, and the call may be classified as likely a vishing attack. As such, a threat threshold may be determined based on one or more factors. The threat threshold may be any operative metric whereby meeting or exceeding the threat threshold may be interpreted as an indication of the existence of a threat, such as a vishing attempt. The threat threshold may be determined based on various factors such as one or more of duration of pauses in the audible speech of the caller, an increase or decrease in a length of pauses in the audible speech of the caller, a number of words spoken in a confidence time window, an increase or decrease in the number of words spoken in a confidence time window, and filler utterances in the audible speech of the caller. The threat threshold may be determined based on various factors such as decibel changes over time of the audible speech of the caller, decibel changes over time of audible speech of a receiver, detection of personal identifier keyword, detection of mimic identifier, detection of promotion keyword, detection of empathy keywords, or correlation between prior statement and current statement of the caller. The threat threshold may be determined based on a value of one or more of a confidence stepper, an ambience checker, or an information stepper, as described herein.

The database 130 may store data extracted from audio data and a classification of and/or percentage likely the corresponding audio data was a vishing attack. The database 130 may store duration of pauses in the audible speech of the caller, an increase or decrease in a length of pauses in the audible speech of the caller, a number of words spoken in a confidence time window, an increase or decrease in the number of words spoken in a confidence time window, filler utterances in the audible speech of the caller, multiple similar background conversations, background conversations in multiple languages, decibel changes over time of the audible speech of the caller, decibel changes over time of audible speech of a receiver, detection of personal identifier keyword, detection of mimic identifier, detection of promotion keyword, detection of empathy keywords, correlation between prior statement and current statement of the caller, etc.

Figure 2:
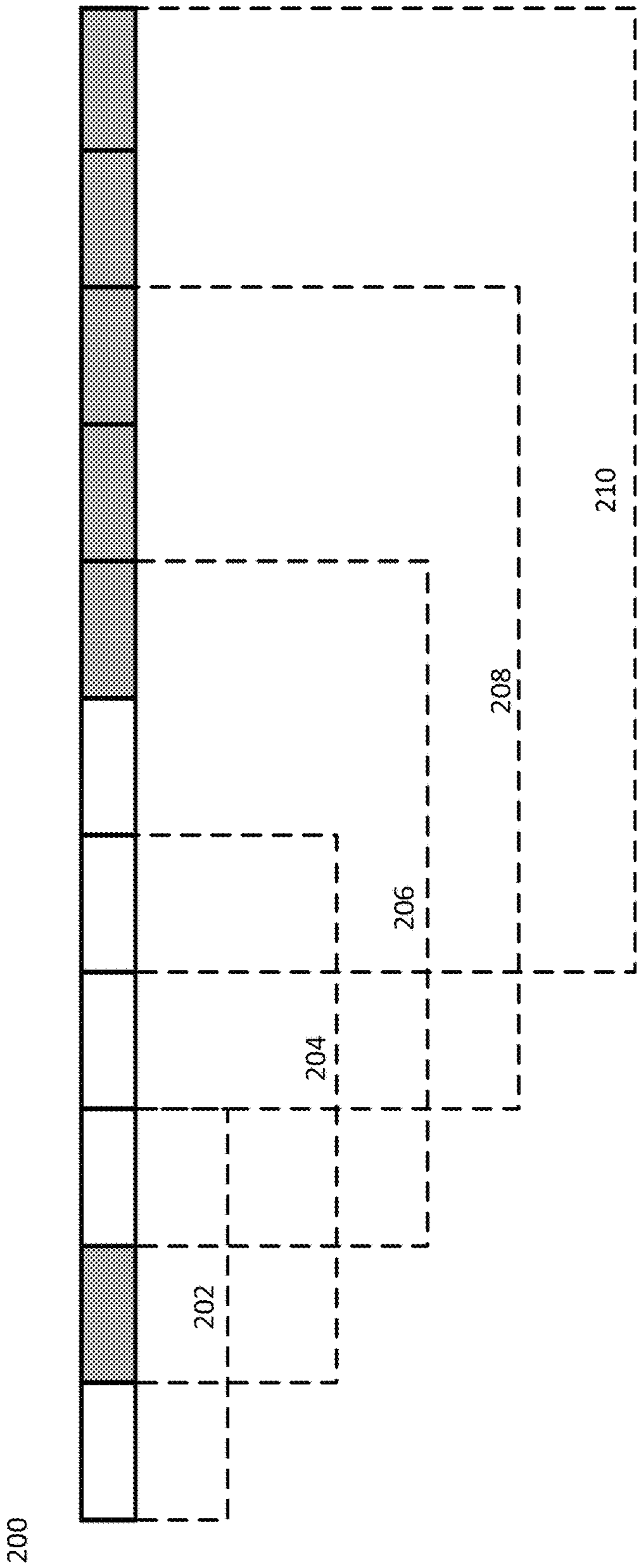
FIG. 2 shows a visual representation of an example sliding window for analyzing audio data to detect pauses.

FIG. 2 shows a visual representation of an example sliding window for analyzing audio data 200 to detect pauses. The audio data 200 is partitioned into segments. The segments are gray if no human voice is recognized and blank and/or white if a human voice is recognized. Each segment within a window that has no human voice recognized may be assigned a value of one, each segment within a window that has a human voice recognized may be assigned a value of zero, and the values of the segments may be summed to determine a value for the window. The audio data 200 may be an isolation of audio data associated with the caller and/or suspected threat actor. The segments may represent a segment of time, such as five seconds. The segments may represent a segment of a conversation, such as a sentence. The sliding window may increase with time to calibrate pauses as vishing callers are usually more confident in a beginning portion of a call and tend to be more fluctuating as the call progresses. Various sliding windows and progressions may be used.

In the example shown in FIG. 2, the sliding window begins with a size of three segments and defines a first window 202. The first window 202 has two segments with human voice recognized and one segment with no human voice recognized. Accordingly, the first window 202 is assigned a value of 0+1+0, or 1.

The sliding window may increase in size by one to a size of four segments and shift to the right one segment to define a second window 204. The second window 204 has three segments with human voice recognized and one segment with no human voice recognized. Accordingly, the second window 204 is assigned a value of 1+0+0+0, or 1.

The sliding window may increase in size by one to a size of five segments and shift to the right one segment to define a third window 206. The third window 206 has four segments with human voice recognized and one segment with no human voice recognized. Accordingly, the third window 206 is assigned a value of 0+0+0+0+1, or 1.

The sliding window may increase in size by one to a size of six segments and shift to the right one segment to define a fourth window 208. The fourth window 208 has three segments with human voice recognized and three segments with no human voice recognized. Accordingly, the fourth window 208 is assigned a value of 0+0+0+1+1+1, or 3.

The sliding window may increase in size by one to a size of seven segments and shift to the right one segment to define a fifth window 210. The fifth window 210 has two segments with human voice recognized and five segments with no human voice recognized. Accordingly, the fifth window 210 is assigned a value of 0+0+1+1+1+1+1, or 5.

Analyzing the sliding window (1, 1, 1, 3, 5) reveals an increase in segments with no human voice detected. This result is consistent with an increase in pause duration and/or pause occurrence, which may be designated as being consistent with a threat such as a vishing attack. Other thresholds and sliding windows may be used.

Figure 3:
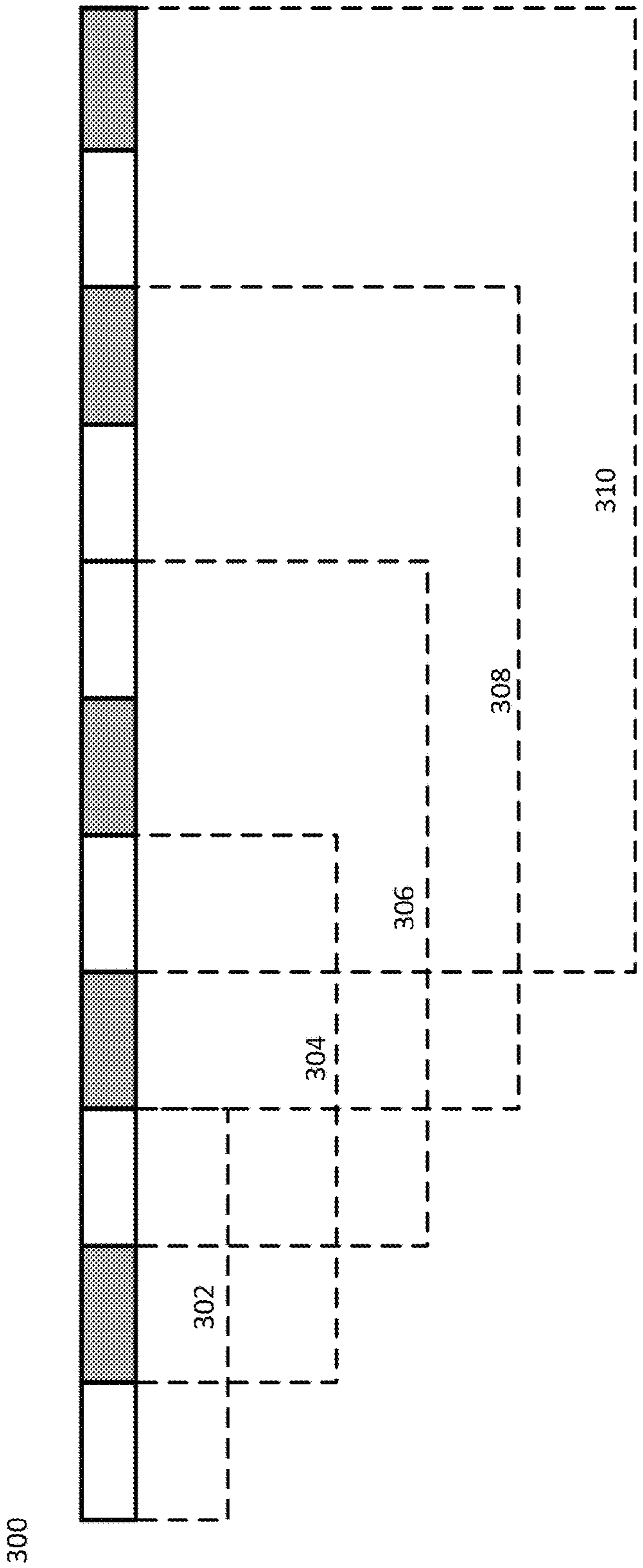
FIG. 3 shows a visual representation of an example sliding window for analyzing audio data to detect pauses.

FIG. 3 shows a visual representation of an example sliding window for analyzing audio data 300 to detect pauses. The audio data 300 is partitioned into segments. The segments are gray if no human voice is recognized and blank and/or white if a human voice is recognized. Each segment within a window that has no human voice recognized may be assigned a value of one, each segment within a window that has a human voice recognized may be assigned a value of zero, and the values of the segments may be summed to determine a value for the window. The audio data 300 may be an isolation of audio data associated with the caller and/or suspected threat actor. The segments may represent a segment of time, such as five seconds. The segments may represent a segment of a conversation, such as a sentence. The sliding window may increase with time to calibrate pauses as vishing callers are usually more confident in a beginning portion of a call and tend to be more fluctuating as the call progresses.

In this example, the sliding window begins with a size of three segments and define a first window 302. The first window 302 has two segments with human voice recognized and one segment with no human voice recognized. Accordingly, the first window 302 is assigned a value of 0+1+0, or 1.

The sliding window may increase in size by one to a size of four segments and shift to the right one segment to define a second window 304. The second window 304 has two segments with human voice recognized and two segments with no human voice recognized. Accordingly, the second window 304 is assigned a value of 1+0+1+0, or 2.

The sliding window may increase in size by one to a size of five segments and shift to the right one segment to define a third window 306. The third window 306 has three segments with human voice recognized and two segments with no human voice recognized. Accordingly, the third window 306 is assigned a value of 0+1+0+1+0, or 2.

The sliding window may increase in size by one to a size of six segments and shift to the right one segment to define a fourth window 308. The fourth window 308 has three segments with human voice recognized and three segments with no human voice recognized. Accordingly, the fourth window 308 is assigned a value of 1+0+1+0+0+1, or 3.

The sliding window may increase in size by one to a size of seven segments and shift to the right one segment to define a fifth window 310. The fifth window 310 has four segments with human voice recognized and three segments with no human voice recognized. Accordingly, the fifth window 310 is assigned a value of 0+1+0+0+1+0+1, or 3.

Analyzing the sliding window (1, 2, 2, 3, 3) reveals an increase in segments with no human voice detected. This result is consistent with an increase in pause duration and/or pause occurrence, which may be designated as consistent with a threat such as a vishing attack. Other thresholds or sliding windows may be used.

However, notice that the increase in segments with no human voice detected in FIG. 3 is more gradual than the increase in segments with no human voice detected in FIG. 2.

A conversation associated with the audio data 200 of FIG. 2 may be classified as a vishing attack with more confidence than a conversation associated with the audio data 300 of FIG. 3. Other thresholds and comparative rules may be used to determine whether a threat is detected.

Similarly, an increase and/or decrease in a number of urgency related words uttered over a sliding window may be assessed. Audio data associated with the caller and/or suspected threat actor may be isolated for analysis of urgency related words. The isolated audio data may comprise the following five sentences, with urgency related words bolded:

1) Good morning.
2) I'm calling from Money Bank.
3) We see that your account is about to be closed because you have not updated your KYC balance.
4) We urge you to update your account number details and passwords details over this call.
5) Okay, You need to like provide the information right away as OTP is um valid only for um 30 seconds basically failing which . . . well your account will be closed and you know you will no longer seriously be able to access your details.

The first two sentences had no urgency related words, the third sentence had two, the fourth sentence had three, and the fifth sentence had six. An increasing trend in a number of urgency related words over time (as determined on a per sentence, on a per period of time, by applying a sliding window over segments of audio data separated by sentences, by applying a sliding window over segments of audio data separated by periods of time, etc.) indicates an increase in urgency, which is indicative of a vishing attack.

Similarly, irrelevant filler utterances and background noises may be assessed. Filler utterances may be words, phrases, and/or noises that are irrelevant to an ongoing conversation. A machine learning (ML) based language detection system may be used to plot languages detected. If the caller uses multiple languages and/or if conversations in background noise use multiple languages, then a call may more likely be a vishing attack. Audio data may be filtered for filler utterances and a gradient of the filler utterances may be calculated over time. The average sentence length may be calculated in the first few minutes of a call, and an appropriate starting window of the sliding window may be assigned based on the calculated average sentence length. Other timing and rules may be used.

An example is helpful to illustrate a sliding window. For this example, assume that a meaningful conversation may occur within 8 words. The starting window may be 8 words. Using sentence 5 from above and with the filler utterances bolded and segments in brackets, the sentence may look like this: [Okay, You need to like provide the information] [right away as OTP is like um valid only for] [um 30 seconds basically failing which . . . well your account will be] [closed and you know you will no longer seriously] [be able to access your details.] There are two filler utterances in the first window of eight words, two in the second window, three in the third window, and three in the fourth window.

FIG. 4 shows a visual representation of an example ambience checker analyzing background conversations. The ambience checker may create and/or use a step-by-step graph of tonal changes. The ambience checker may analyze multiple conversations and/or words in background noise to determine similarities. The ambience checker may detect a similar pattern of call happening across a call center associated with a vishing threat. Threat actors at the call center may be reading from the same script. The ambience checker may detect multiple similar conversations within a timeframe. The ambience checker may detect multiple languages within single conversations happening in the background, which may be indicative of vishing threat.

The ambience checker may measure background noises. The ambience checker may distinguish particular conversations based on voice recognition. The ambience checker may extract and map conversations detected in background noise so that the extracted conversations may be compared regardless of speech speed or time when they occurred. Table 400 shows such a mapping of four conversations. The conversations are put into rows. For illustration, each word is assigned its own column. As shown, the words "urge", "you", "to", and "update" appear, in that order, in multiple conversations. Conversation 3 may be shifted once to the right to attempt to align the words with conversation 1. Conversation 4 may be shifted once to the left to attempt to align the words with conversation 1 and right-shifted conversation 3. Three out of the four extracted conversations have overlapping dialog at different time frames, which is consistent to threat actors reading from a script as they might in a vishing call center. Overlap within extracted conversations may be used to learn a vishing script. The Threat model 120 in FIG. 1 may be updated to flag a call as a vishing attack if it appears that a caller is reading from the vishing script.

FIG. 5 shows a visual representation of an example information stepper analyzing calls. The information stepper may create and/or use a step-by-step graph of informational changes. The information stepper may track what is anticipated in a conversation. The information stepper may track what changed in a conversation. The information stepper may track changes in information flow in a conversation. The information stepper may predict a next standard sentence from a professional call. The information stepper may predict a next sentence in a vishing call. A training dataset may be built with vishing calls and/or standard calls. A training dataset of vishing data may be built with a mapping of a vishing caller's behavior.

FIG. 5 shows a table 500 with such a mapping. The first column of table 500 identifies a call. The second column of table 500 shows a rate of change over time of volume in decibels of a caller. The third column of table 500 shows a rate of change over time of volume in decibels of a user. The fourth column of table 500 shows a number of personal identifier keywords uttered by the caller. The fifth column of table 500 indicates if the call recipient acknowledges the caller. A 'yes' in the fifth column could mean that the call recipient knows the caller. A 'yes' in the fifth column could mean that the caller is attempting to mimic a person known to the call recipient. The sixth column of table 500 shows a number of promotion keyword instances. The seventh column of table 500 shows a number of empathy keyword instances. The eighth column of table 500 shows a number indicative of how coherent and/or correlated statements made by the caller are/were. In a normal conversation, correlation should exist between sentences for a speaker. The number indicative of how coherent are/were the caller's statements may be created by using one or more machine learning (ML) summarization models to summarize portions of the call and comparing the summarized portions. The closer to 1 a number is, the more correlated and/or coherent the caller's statements may be. The closer to 0 a number is, the less correlated and/or coherent the caller's statements may be. The number returned may be binary-'1' indicating the caller's statements are/were corelated and/or coherent and '0' otherwise. The ninth column of table 500 may indicate if a corresponding call is/was determined to be a vishing attack. A model may be trained to identify patterns of information exchange between a caller and call recipient based on the features and/or attributed in the second, third, fourth, fifth, sixth, seventh, eighth, and/or ninth columns of table 500.

For example, a first call may be determined to have a caller with a decibel rate change of 15, a call recipient decibel rate change of 1, 12 personal identifier keyword utterances by the caller, an acknowledgement of the caller by the call recipient, 2 instances of promotion keywords being uttered, 10 instances of empathy keywords being uttered, and non-correlation between statements made by the caller. The first call may be determined to be a vishing attack. As another example, a second call may be determined to have a caller with a decibel rate change of 2, a call recipient decibel rate change of 1, 2 personal identifier keyword utterances by the caller, an acknowledgement of the caller by the call recipient, 0 instances of promotion keywords being uttered, 2 instances of empathy keywords being uttered, and correlation between statements made by the caller. The second call may not be determined to be a vishing attack. Such examples are intended to be illustrative. Other values and representative relationships may be used to identify patterns.

FIGS. 6A-6H show an example dialog between a threat actor and a potential vishing victim. The threat actor may be in the threat actor 140. The potential vishing victim may have the user device 150. The threat actor 140 and the user device 150 may be connected via the network 100.

Figure 6A:
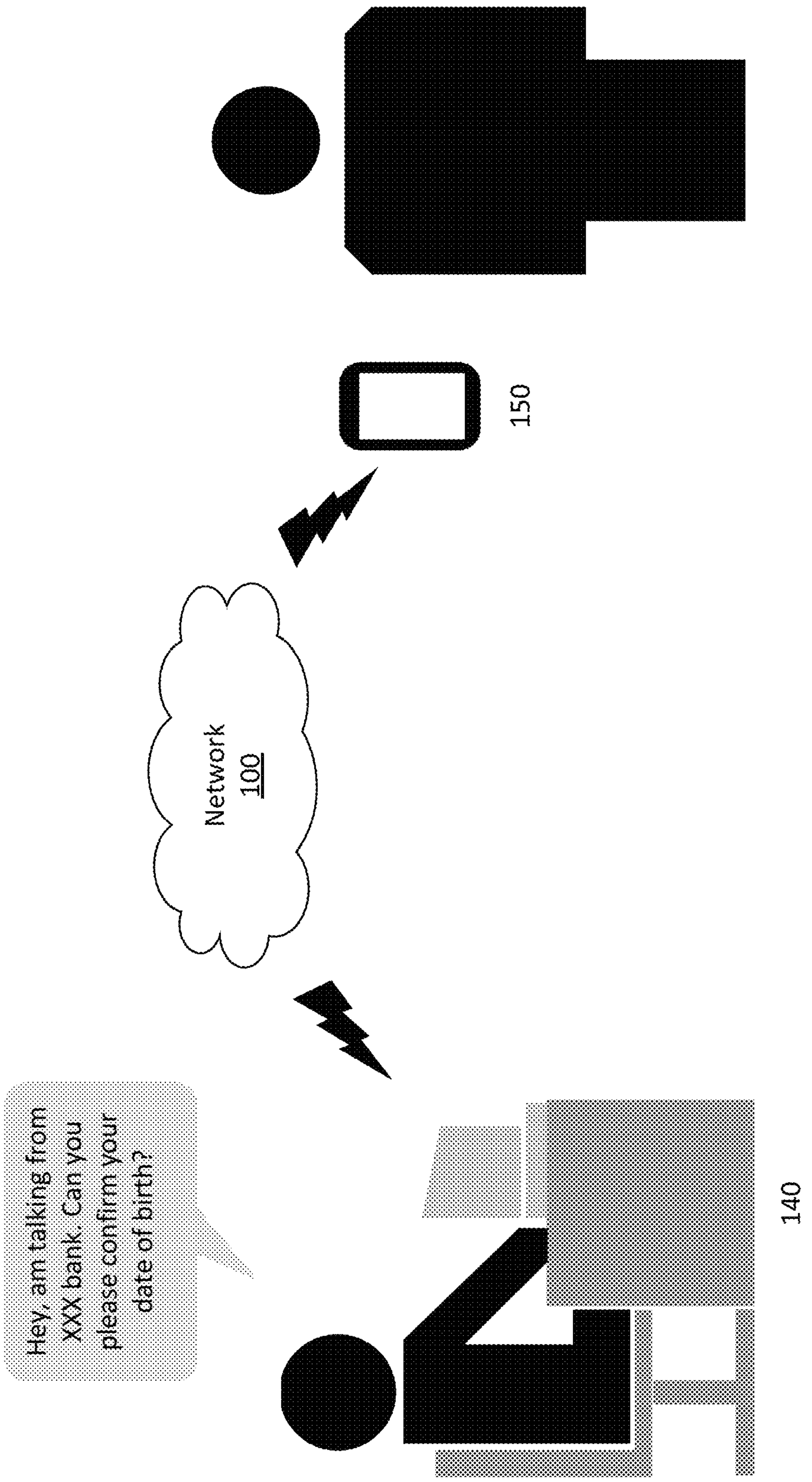
FIGS. 6A-6H show an example dialog between a threat actor and a potential victim.
Figure 6B:
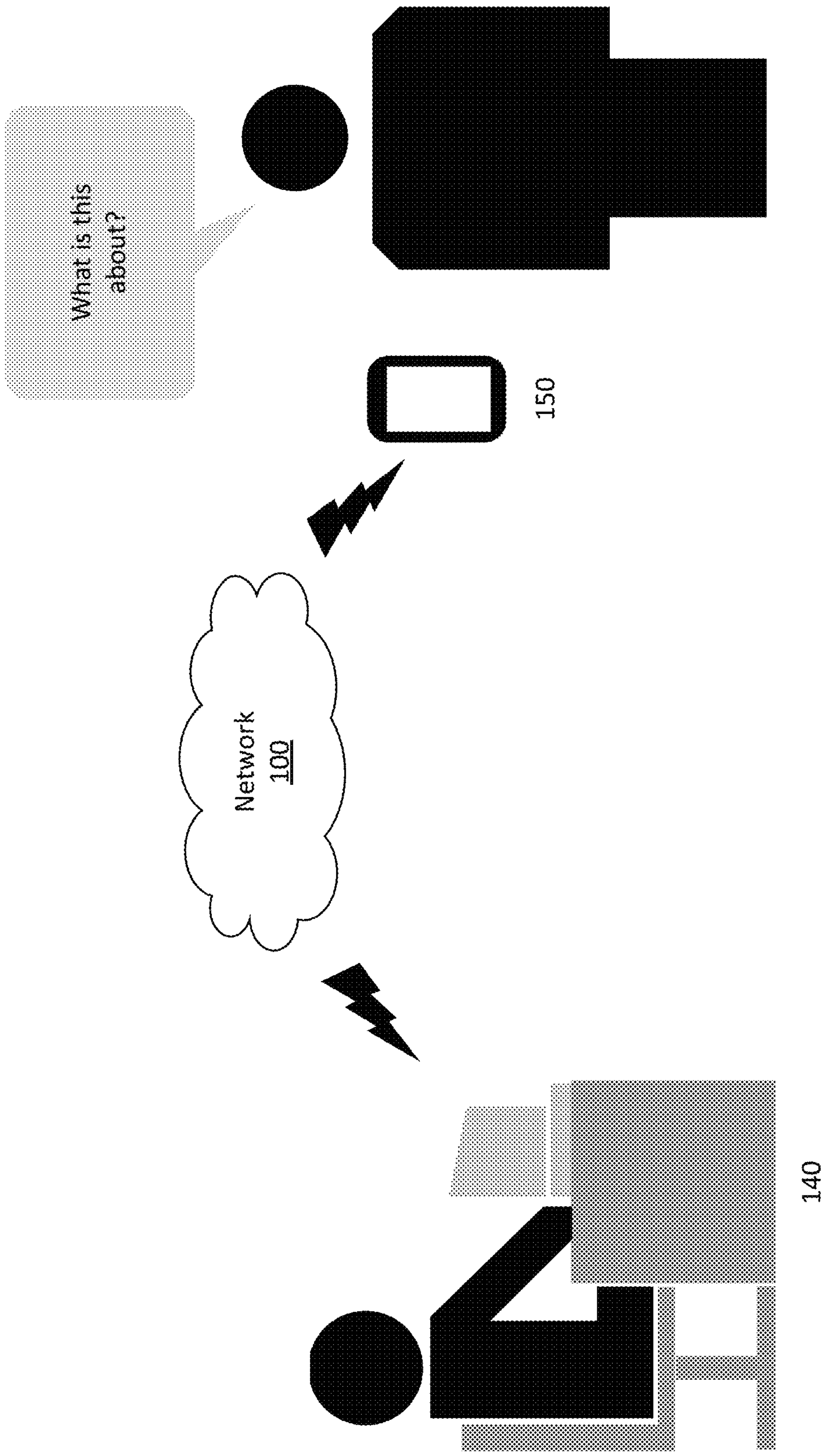
Figure 6C:
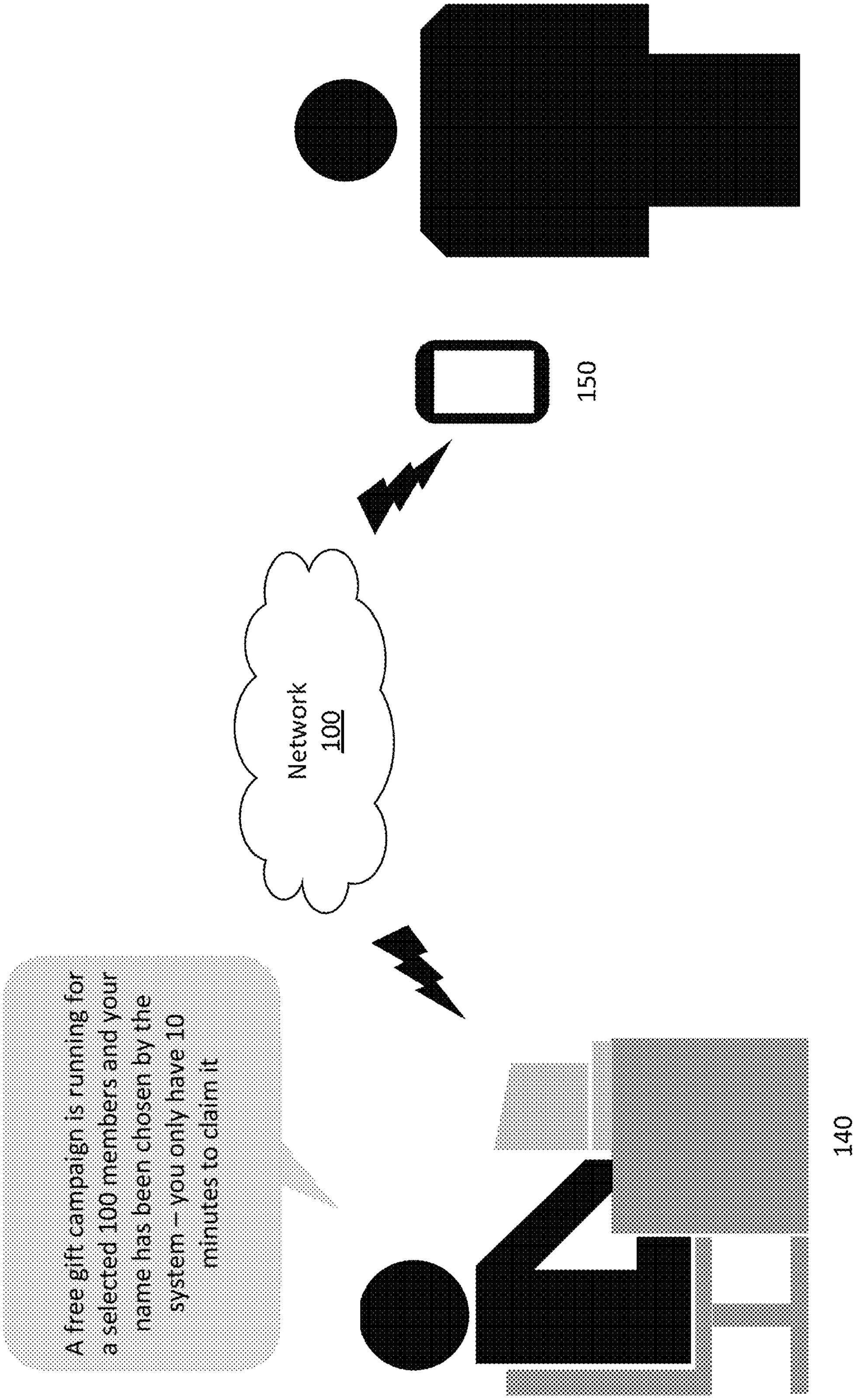
Figure 6D:
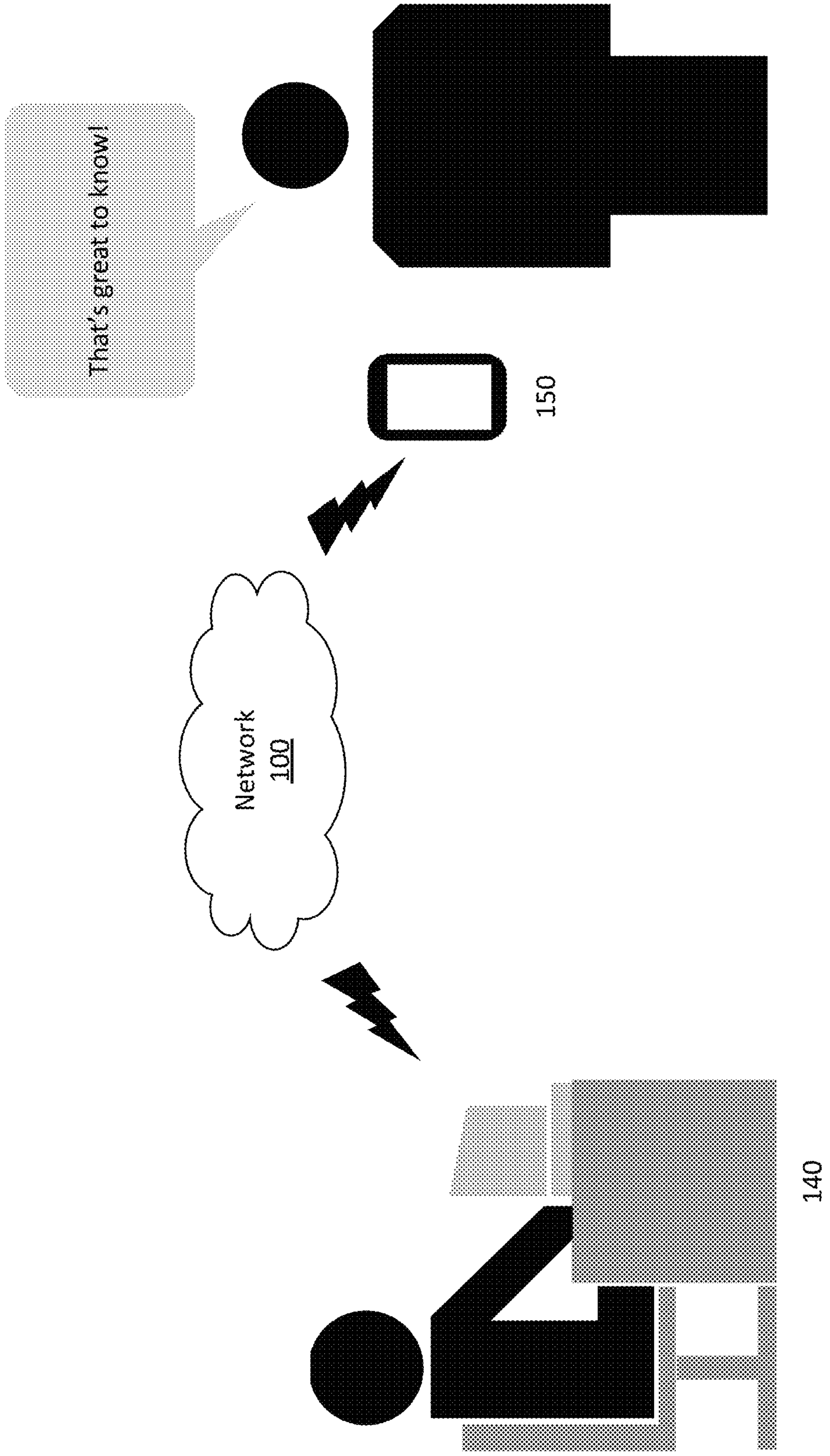
Figure 6E:
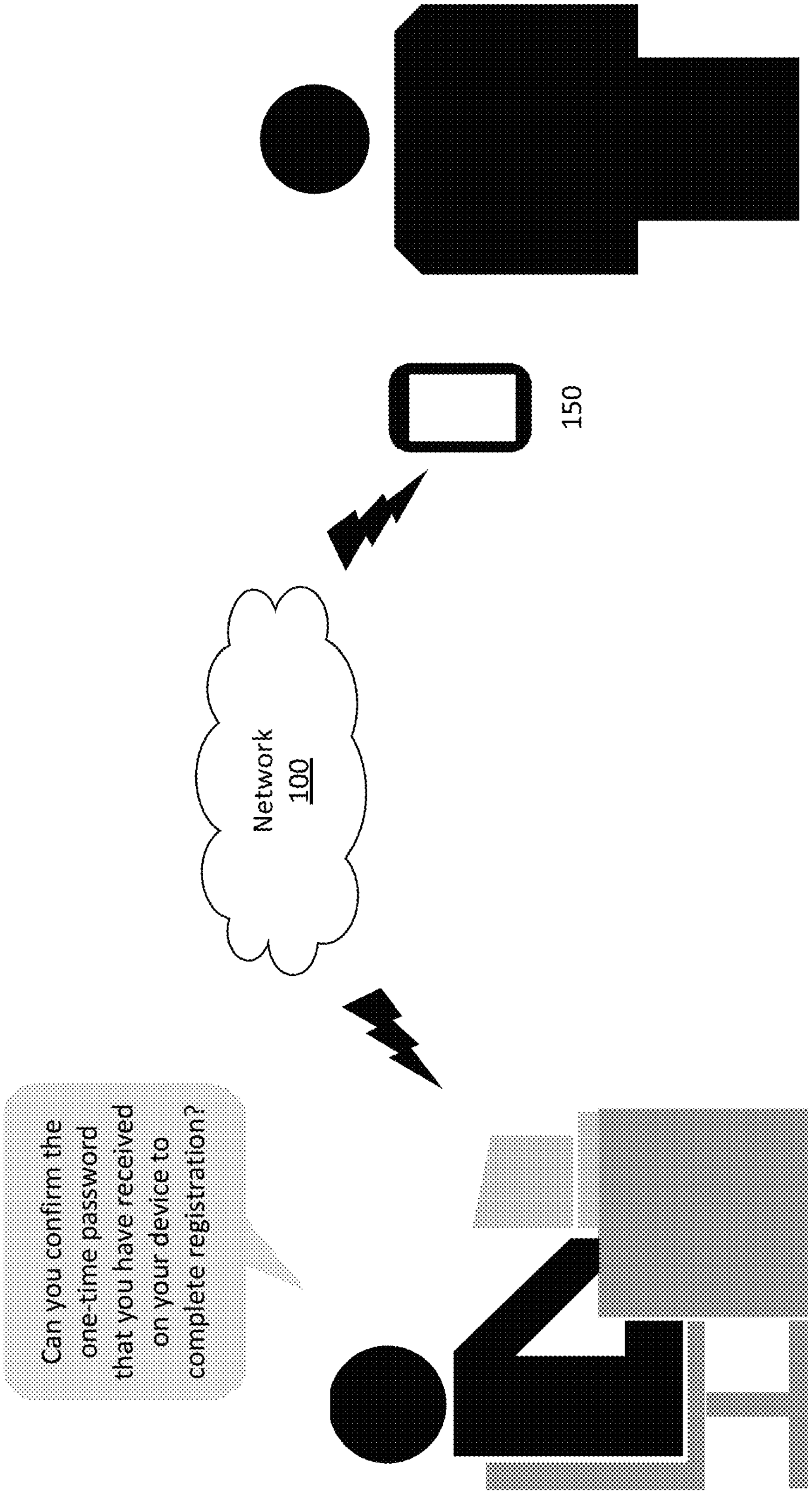
Figure 6F:
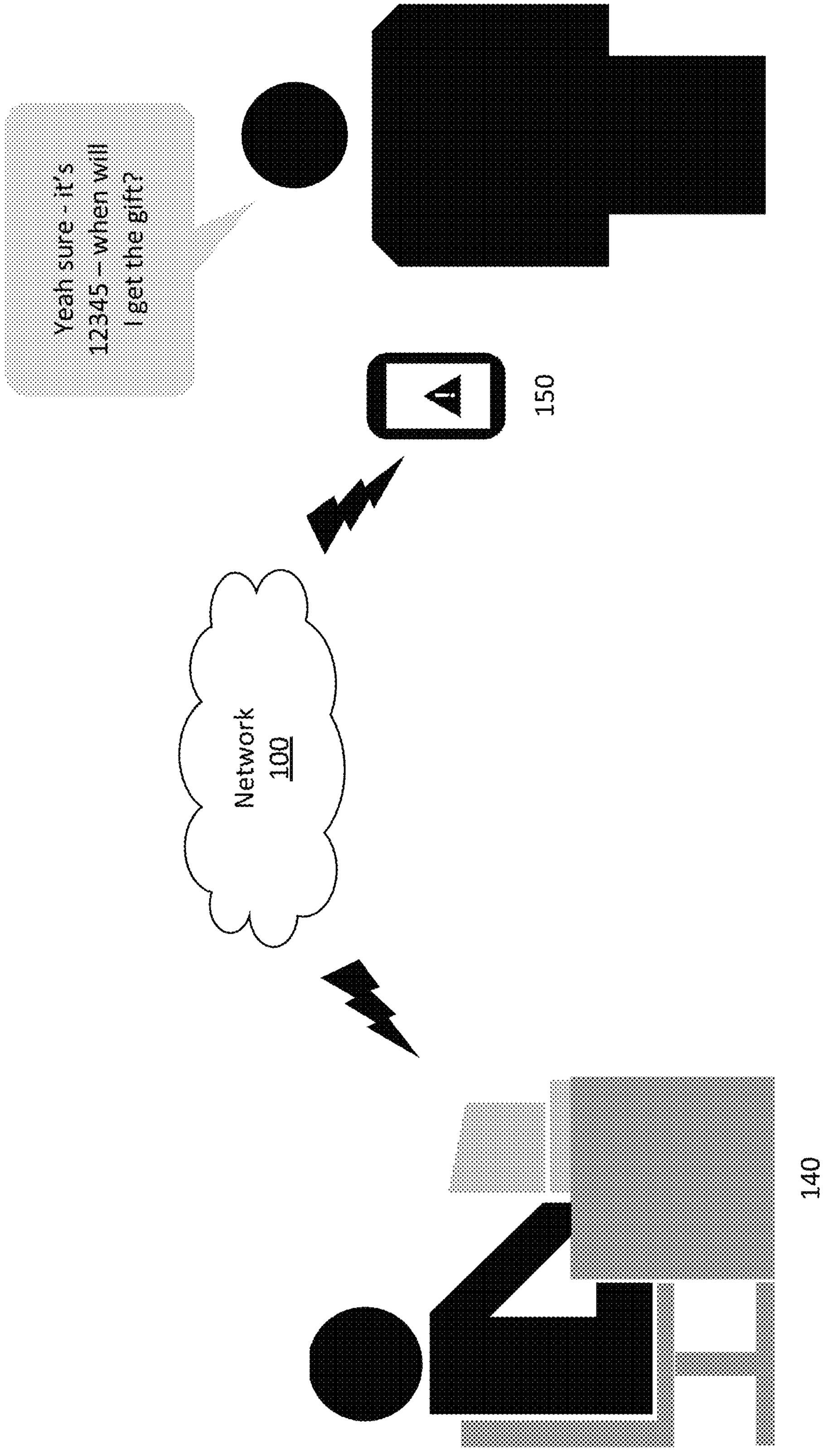

Turning first to FIG. 6A, the threat actor may claim to be from a bank. The threat actor may ask for personal identifier keyword, such as a birthday. Turning to FIG. 6B, in response, the potential vishing victim may ask why the caller is calling. Turning now to FIG. 6C, the threat actor may use promotion keywords to try to trick the potential vishing victim into thinking the potential vishing victim needs to reveal personal identifier keyword to claim a prize. The threat actor may use urgency keywords to put urgency on the potential vishing victim to reveal information, preventing the potential vishing victim from taking more time to think about the consequences of revealing the information and how likely the call is legit. Turning to FIG. 6D, the potential vishing victim appears to believe the threat actor and to be falling for a vishing attack. Turning to 6E, the threat actor may ask the potential vishing victim for personal identifier keyword, such as a one-time password. Turning to 6F, the potential vishing victim tries to give the information asked for to the threat actor; however, corrective action is applied to the potential vishing victim via user device 150.

Figure 6G:
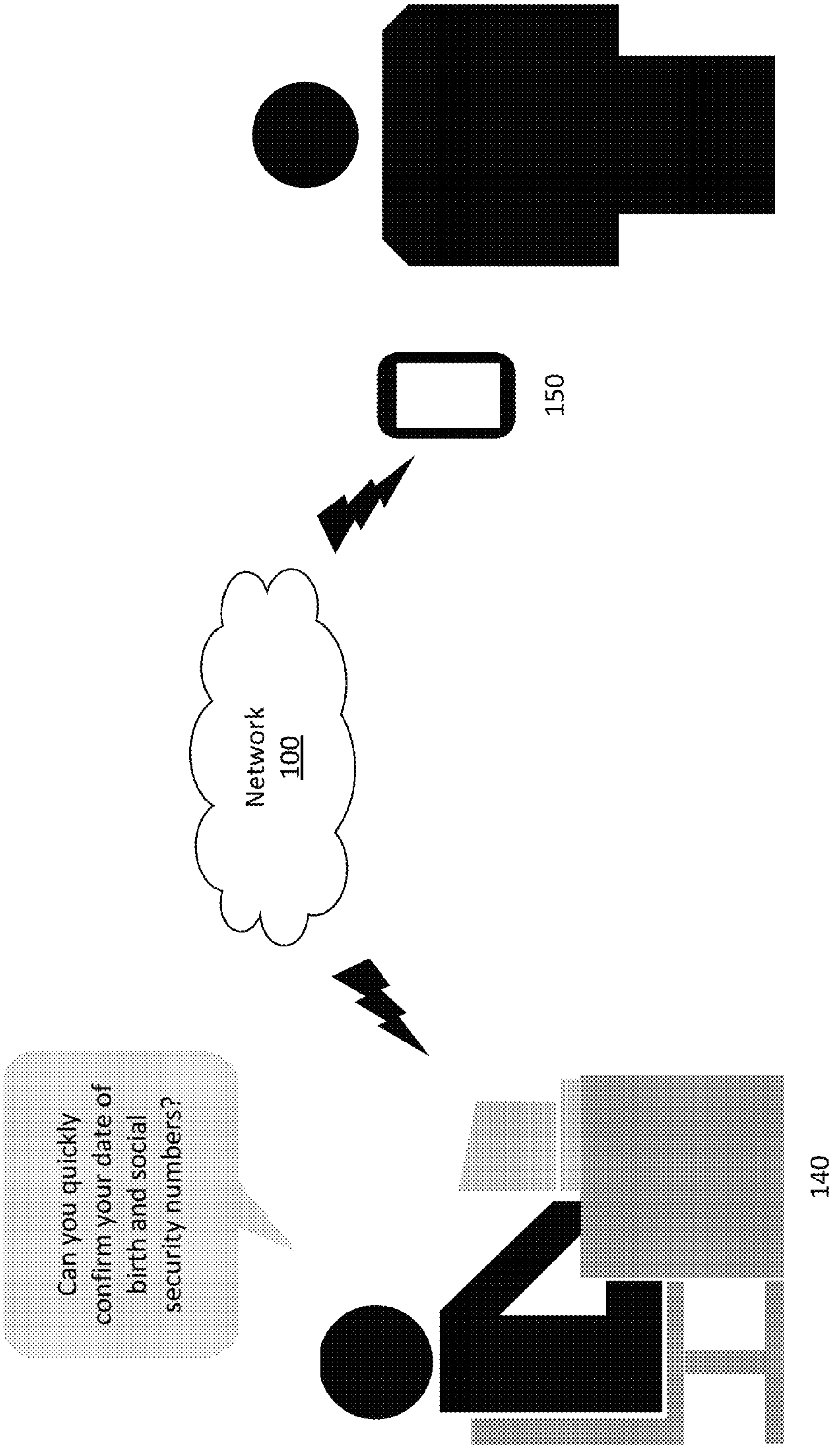
Figure 6H:
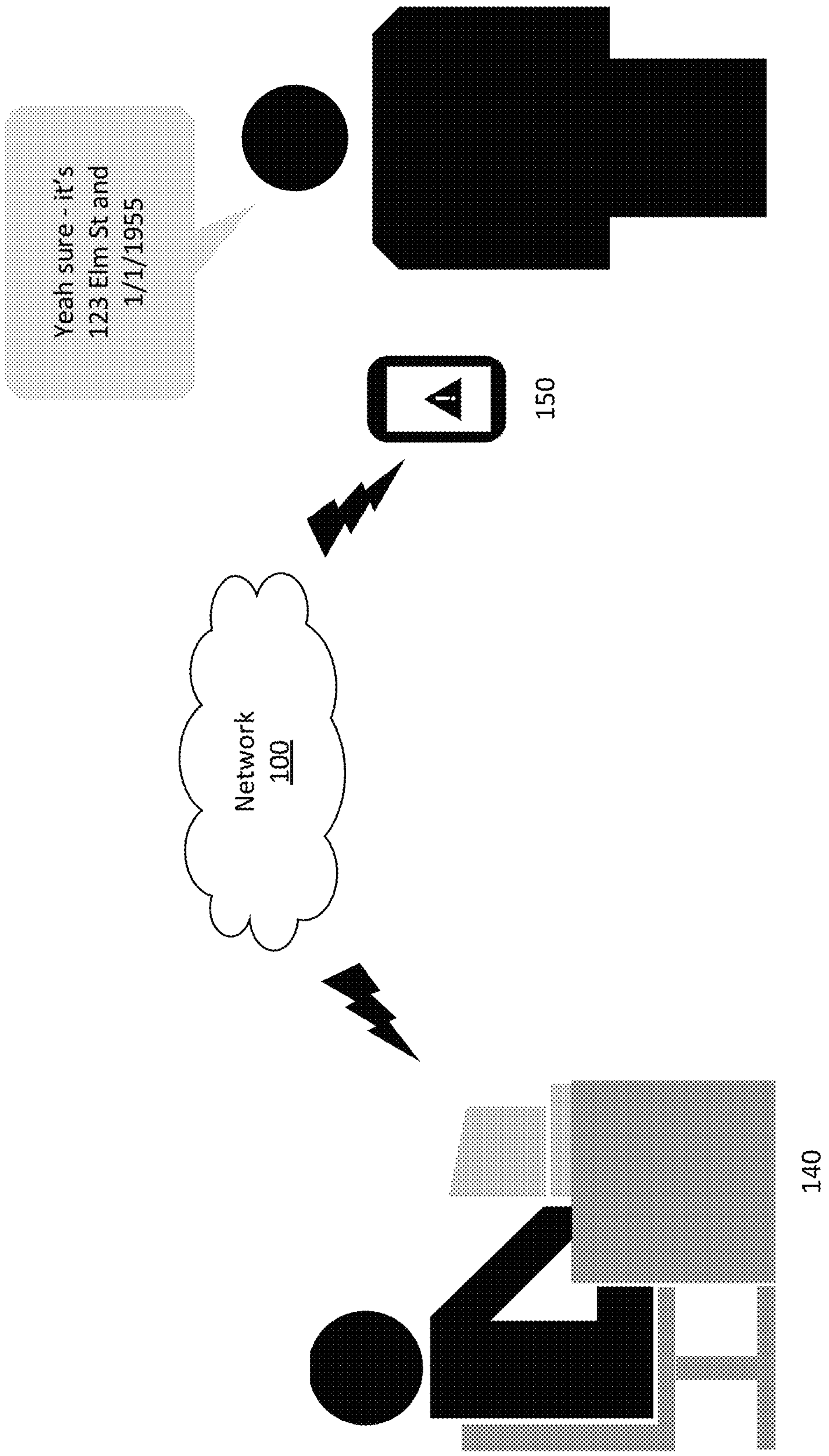

The corrective action may include notifying the potential vishing victim via vibration, sound, lights, a screen message, etc. The corrective action may include causing a microphone associated with the potential vishing victim user device 150 to be disabled. The corrective action may include adding noise, sound, tones, etc. to audio received by the microphone associated with the potential vishing victim user device 150. Turning to FIG. 6G, the threat actor may ask the potential vishing victim for personal identifier keywords again, such as date of birth, social security number, etc. The threat actor may use urgency keywords. Turning to FIG. 6H, the potential vishing victim may once again try to give the information asked for to the threat actor. However, once again, corrective action may be applied to the potential vishing victim user device 150.

Figure 7:
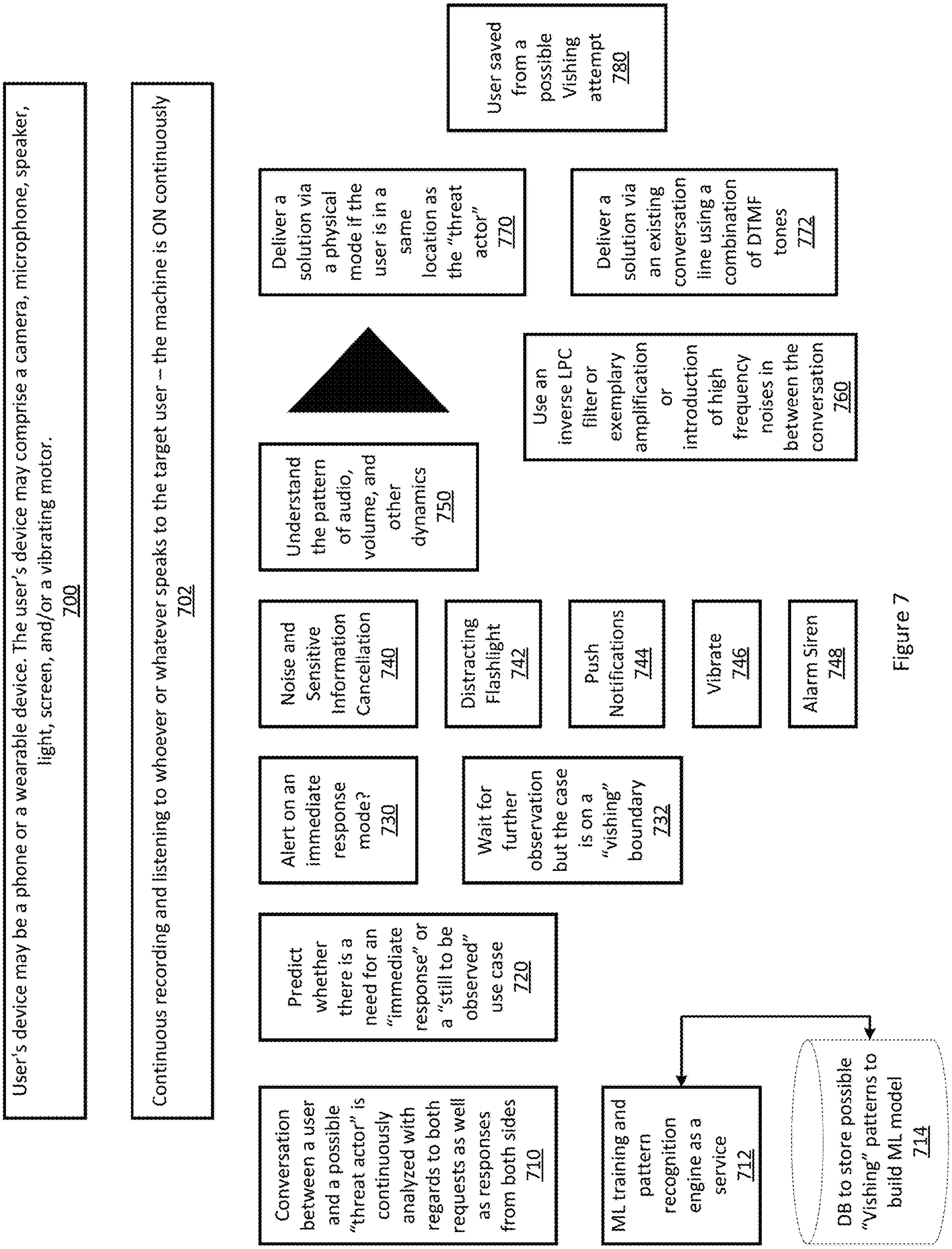
FIG. 7 shows an example visual representation of real-time threat detection.

FIG. 7 shows a non-limiting, illustrative schematic example of real-time vishing detection. Block 700 comprises aspects of the potential vishing victim's user device. The potential vishing victim's user device may comprise a phone, such as a smart phone, or a wearable device, such as a wearable computing device. The potential vishing victim's user device may comprise a camera, a microphone, a speaker, a light (such as a flashlight, camera flash, etc.), a screen, a vibrating motor, any other component useful for getting a user's attention. The potential vishing victim's user device may store and execute an application in communication with a device comprising a camera, a microphone, a speaker, a light, a screen, a vibrating motor, any other component useful for getting a user's attention. The potential vishing victim's user device may store and execute an application that is in communication with a remote monitor and provides audio data to the remote monitor. The potential vishing victim's user device may store and execute an application comprising the monitor. Block 702 comprises aspects of operation of an exemplary method of the present disclosure. In the exemplary method, audio data recorded and/or presented by the potential vishing victim's user device may be continuously recorded. In the exemplary method, a monitor may be listening to anyone that speaks to the potential vishing victim via and/or in the presence of the potential vishing victim's user device. In the exemplary method, the potential vishing victim's user device may be continuously on.

Blocks 710, 712, and database 714, illustrate a possible vishing attack. As shown in block 710, a conversation between the potential vishing victim and a possible threat actor may be continuously analyzed. The possible threat actor's portion of the conversation could be separately analyzed. The potential vishing victim's portion of the conversation could be separately analyzed. The entire conversation could be analyzed together. As shown in block 712, one or more machine learning (ML) model may be trained for analyzing conversations and identifying threat actors and/or vishing attacks. The one or more trained model may be based on pattern recognition, such as recognition of threat patterns. An application in communication with the one or more model may provide a threat pattern recognition engine as a service. Database 714 may store conversations, as well as extracted and/or determined information about the conversations. The stored conversations and information about the conversations may be used to identify vishing and/or normal conversation patterns. Attributes that show up commonly in vishing calls and not in normal calls, may be emphasized (given weight) in monitoring future calls for vishing. Data stored in the database 714 may be provided for ML training. Data stored in the database 714 may be provided for a pattern recognition engine as a service.

At block 720, a prediction may be made as to whether there is a need for an immediate response or a still to be observed use case. There are multiple reasons why it may be desirable to observe as opposed to taking corrective action, even if a vishing attempt is suspected. First, the call may not be a vishing attack. If the call is not a vishing attack, the corrective action taken may be annoying to the caller and/or the call recipient. If the system waited and gathered more information, it may have become apparent that the call is not a vishing attack. Also, even if the call is a confirmed vishing attack, it may be beneficial to allow the call to progress so that more conversation attributes may be gathered to better train the one or more Model.

At 730, a decision may be made of what type of alert mode the potential vishing victim's user device is set to. The type of alert mode that mode the potential vishing victim's user device is set to may be caused to activate in the potential vishing victim's user device. At block 732, the conversation may be continued to be observed; however, a decision of likely vishing has already been made.

At block 740, noise and sensitive information may be canceled. This may include disabling the call recipient's audio data when the call recipient is giving sensitive information. This may include adding artificial noise to the call recipient's response when the response includes sensitive information. At block 742, a distracting flashlight may activate. The flashlight may turn on. The flashlight may strobe on and off. The flashlight may be a component of the potential vishing victim's user device. The flashlight may be a component of a device in communication with an application executing on the potential vishing victim's user device. At block 744, the potential vishing victim's user device may receive one or more push notification. The push notification may warn the potential vishing victim of the threat actor. At block 746, the potential vishing victim's user device may be caused to vibrate. At block 748, an alarm associated with the potential vishing victim's user device may be caused to activate. The alarm may be associated with an application executing on the potential vishing victim's user device, such as a phone application, clock application, etc.

Block 750 illustrates what may happen if the conversation continues after an alert is activated. The conversation may continue to be monitored to assess patterns in the conversation, such as duration of pauses in the audible speech of the caller and/or call recipient, an increase or decrease in a length of pauses in the audible speech of the caller and/or call recipient, a number of words spoken by the caller and/or call recipient in a confidence time window, an increase or decrease in the number of words spoken by the caller and/or call recipient in a confidence time window, filler utterances in the audible speech of the caller and/or call recipient, background sounds and/or conversations, decibel of audible speech of the caller and/or call recipient, decibel changes over time of the audible speech of the caller and/or call recipient, detection of personal identifier keyword spoken by the caller and/or call recipient, detection of mimic identifier by the caller and/or call recipient, detection of acknowledgement of mimic identifier by the call recipient, detection of promotion keyword spoken by the caller and/or the call recipient, detection of empathy keywords by the caller and/or the call recipient, correlation between prior statement and current statement of the caller, etc.

At block 760, audio data from the conversation may be processed. Processing the audio data may comprise using linear predictive coding (LPC) or inverse filtering. As an illustrative example, the audio data may be processed to generate an inverse audio signal. As a further example, the audio data may represent audio having a signal waveform, and the inverse audio signal may be at least partial inverse of the base signal waveform. As such, processing of an inverse audio and overlaying the inverse audio with the original audio data may "nullify" or interfere with the ability to receive or make use of the audio data. As an example, the application of inverse audio on the audio data may limit the ability of the threat actor to hear what was said by the victim. As a further example, amplification may be implemented as a response maneuver where loud and "audibly uncomfortable" tones and combinations are simulated so that the ability of the threat actor to hear or understand what the victim is speaking may be impacted. Other processing may be used based on the audio data and may be implemented at various times.

At block 770, a physical mode may be engaged on the potential vishing victim's user device. For example, the potential vishing victim's user device may be caused to vibrate constantly until the potential vishing victim interacts with the user device. The physical mode being engaged may be used if the threat actor is in a same location as the potential vishing victim. For example, block 770 may happen if a threat actor is standing in front of a potential vishing victim, the conversation is happening face to face, and a microphone from the potential vishing victim's user device is detecting both the potential vishing victim's speech and the threat actor's speech. The potential vishing victim's speech may be known from previous conversations and speech picked up by the microphone over time. As referenced here, a physical mode may include non-digital and may relate to the selective application of amplified noises, vibration, strobes, alerts and the like. As such, data processing of the audio data or implementation of corrective action via the communication channel may not be necessary. It is understood that physical corrective action and digital corrective action may be used independently or in concert.

At block 772, the conversation may be interrupted using one or more dual tone multi frequency (DTMF) tone. The one or more DTMF tone may be used to annoy one or more of the threat actor and the potential vishing victim until the conversation is ended. The one or more DTMF tone may be used to render the speech of the potential vishing victim incomprehensible by the threat actor. The one or more DTMF tone may be used to block the general speech of the potential vishing victim. The one or more DTMF tone may be used to block specific speech of the potential vishing victim, such as sensitive data, like social security number, date of birth, password, and other personal identifier information.

Block 780 may show that the potential vishing victim was saved from a vishing attempt. Here, an explanation of the threat and the steps taken may be provided to the potential vishing victim on a screen of the potential vishing victim's user device.

Figure 8:
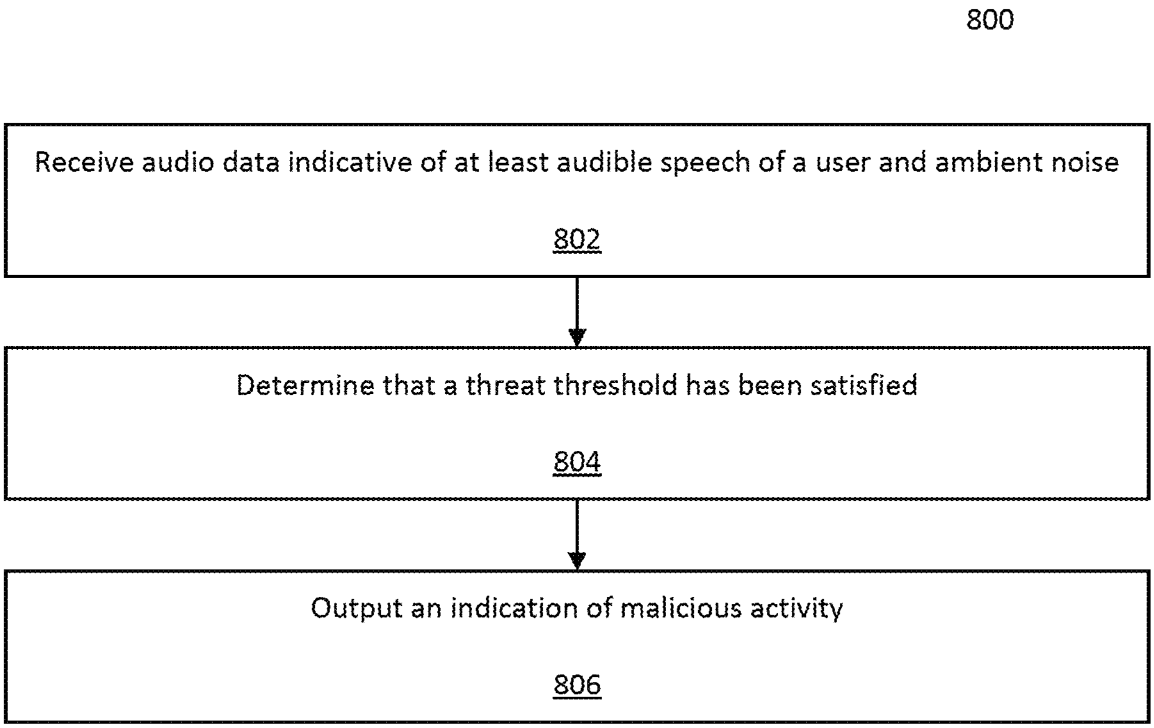
FIG. 8 shows a flowchart of an example method for real-time threat detection.

FIG. 8 is a flowchart of an example process 800. In some implementations, one or more process blocks of FIG. 8 may be performed by a device such as via hardware and or software operatively disposed on a user device, for example, the user device 150. Other devices or components may be used to implement the methods.

As shown in FIG. 8, process 800 may include receiving audio data indicative of at least audible speech of a user (caller) and ambient noise, at 802. The audio data may be received via a computing device, such as a smart phone, etc. The audio data may be received via a sensor of the computing device, such as a microphone or other component configured to receive or record audio data. For example, a device may receive, via a computing device and/or sensor associated with a first user (call recipient), audio data indicative of at least audible speech of a second user (caller) and ambient noise, as described herein. The ambient noise may comprise ambient audible speech, such as background voices and conversations, for example. The ambient audible speech may comprise any audible speech that is detected that is separate from the audible speech of the second user. Ambient audible speech may comprise contemporaneous conversations in the background such as from a call center or in an environment with several speakers and detectable speech. As also shown in FIG. 8, process 800 may include determining that a threat threshold has been satisfied, at 804. Determining that a threat threshold has been satisfied, may comprise analyzing the audio data to determine that a threat threshold has been satisfied. Determining that a threat threshold has been satisfied may be based on a comparison of the audible speech of the second user and the ambient audible speech. The analysis may be periodic or continuous. The analysis may be in real-time as the audio data is received. The analysis may be based on a threat model such as threat model 120, where the threat model 120 is based at least on threat pattern recognition. The threat pattern recognition may be based at least on a comparison of the audible speech of the second user and the ambient audible speech.

The threat threshold may be set by one or more threat factors. As an illustrative example, the threat threshold may be any operative metric whereby meeting or exceeding the threat threshold may be interpreted as an indication of the existence of a threat, such as a vishing attempt. The threat threshold may be determined based on various factors such as one or more of duration of pauses in the audible speech of the caller, an increase or decrease in a length of pauses in the audible speech of the caller, a number of words spoken in a confidence time window, an increase or decrease in the number of words spoken in a confidence time window, and filler utterances in the audible speech of the caller. The threat threshold may be determined based on various factors such as decibel changes over time of the audible speech of the caller, decibel changes over time of audible speech of a receiver, detection of personal identifier keyword, detection of mimic identifier, detection of promotion keyword, detection of empathy keywords, or correlation between prior statement and current statement of the caller. The threat threshold may be determined based on a value of one or more of a confidence stepper, an ambience checker, or an information stepper, as described herein.

The analyzing the audio data to determine that a threat threshold has been satisfied may be based at least in part on a threat model. The determining that a threat threshold has been satisfied may be based at least in part on a threat model. The threat model may be or comprise a ML model. Other models and rule sets may be used.

The threat model may comprise a confidence stepper, as described herein. The determining that a threat threshold has been satisfied may comprise a confidence stepper. As an example, the threat threshold may be based at least on a value of the confidence stepper. The confidence stepper may be based on one or more of duration of pauses in the audible speech of the caller, an increase or decrease in a length of pauses in the audible speech of the caller, a number of words spoken in a confidence time window, an increase or decrease in the number of words spoken in a confidence time window, and filler utterances in the audible speech of the caller. The confidence stepper comprises a sliding confidence time window configured to be adjusted based on at least a comparison of the audio data to a comparative data set, as described herein. The comparative data set may comprise non-threat data. The comparative data set may comprise threat data such as information indicative of a threat pattern or threat behavior.

The threat model may comprise an ambience checker, as described herein. The determining that a threat threshold has been satisfied may comprise an ambience checker. As an example, the threat threshold may be based at least on a value of the ambience checker. The ambience checker may be configured to detect ambient information from the audio data and compare the ambient information to the audible speech of the caller to determine that the threat threshold has been satisfied. Ambient information may comprise ambient audible speech.

The threat model may comprise an information flow stepper, as described herein. The determining that a threat threshold has been satisfied may comprise an information flow stepper. As an example, the threat threshold is based on a value of the information flow stepper. The information flow stepper may be based on at least a comparison of the audio data to a comparative data set. The comparative data set may comprise non-threat data. The comparative data set may comprise threat data such as information indicative of a threat pattern or threat behavior. The information flow stepper may be based on one or more of decibel changes over time of the audible speech of the caller, decibel changes over time of audible speech of a receiver, detection of personal identifier keyword, detection of mimic identifier, detection of promotion keyword, detection of empathy keywords, or correlation between prior statement and current statement of the caller.

As further shown in FIG. 8, process 800 may include outputting, based on the determination that the threat threshold has been satisfied, an indication of malicious activity, at 806. In addition to outputting an indication of malicious activity, corrective action may be caused and/or outputted based on the determination that the threat threshold has been satisfied. For example, the user device may cause and/or output a corrective action, as described herein. The corrective action may comprise causing a tactile feedback to be provided to the call recipient. The corrective action may comprise causing a visual feedback to be provided to the call recipient. The visual feedback may comprise a flashing light. The corrective action may comprise causing an audio feedback to be provided to the call recipient. The audio feedback may comprise an audible sound. The audio feedback may comprise a dual tone multi frequency (DTMF) tone. The corrective action may comprise causing a notification to be displayed on a device associated with the call recipient. The corrective action may comprise altering the audio data received via the sensor. Altering the audio data may comprise interrupting the audio data from being received by the call recipient. Altering the audio data may comprise adding artificial audio data to the audio data. Corrective action may also include generating an inverse audio signal based on the vocal conversation (e.g., audio data) and overlaying the inverse signal on the base audio to interfere or nullify at least a portion of the audible conversation. Other corrective actions may be used via one or more devices.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
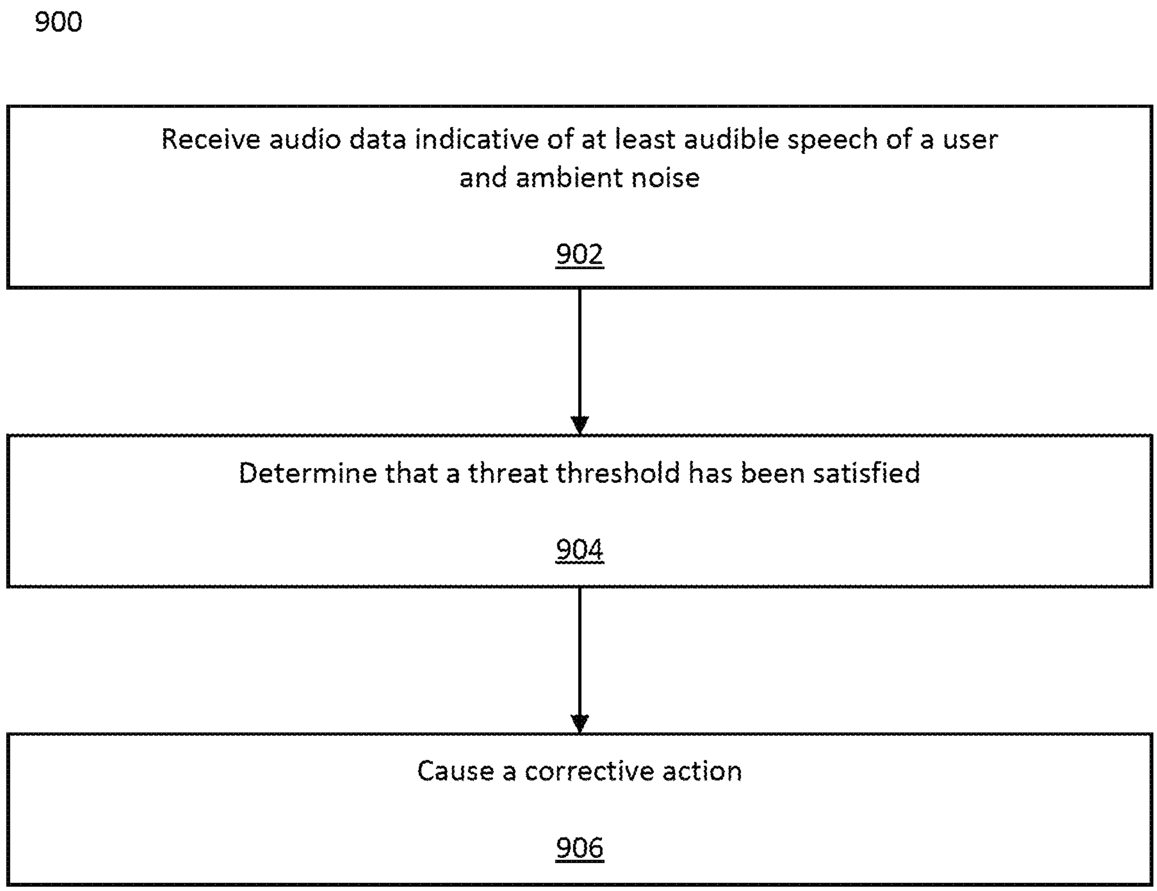
FIG. 9 shows a flowchart of an example method for real-time threat detection.

FIG. 9 is a flowchart of an example process 900. In some implementations, one or more process blocks of FIG. 9 may be performed by a device such as a user device or network device. As shown in FIG. 9, process 900 may include receiving audio data indicative of at least audible speech of a user (caller) and ambient noise, at 902. The audio data may be received via a computing device, such as a smart phone, etc. The audio data may be received via a sensor of the computing device, such as a microphone or other component configured to receive or record audio data. For example, a user device may receive, via a computing device and/or sensor associated with a first user (recipient of a call), audio data indicative of at least audible speech of a second user (caller) and ambient noise, as described herein. The ambient noise may comprise ambient audible speech, such as background voices and conversations, for example. The ambient audible speech may comprise any audible speech that is detected that is separate from the audible speech of the second user. Ambient audible speech may comprise contemporaneous conversations in the background such as from a call center or in an environment with several speakers and detectable speech.

As also shown in FIG. 9, process 900 may include dividing the audio data into a plurality of sections. For example, hardware or software may be configured to divide the audio data into a plurality of sections, as described herein. The audio data may be divided into sections based on any classifier or metric. As a non-limiting example, the audio data is divided based on a portion of the audio data associated with the voice of a call recipient or a portion of the audio data associated with the voice of a caller. Other divisions may be used such as sections of pause, silence, fillers, repeated words, unusual high or low pitch, or questions or answers. Other divisions may be used. As an illustrative example, the audio data may be analyzed to determine the voice of one or more of a first user or a second user. As a further example, the audio data may be analyzed based on a model such as a learning model that is configured to compare real-time audio data to a set of other data or patterns. As such, the audio data may be divided based at least on the model to separate a portion of the audio data associated with a first user from a portion the audio data associated with a second user. Other models and methods may be used. The audio data may be stored and used to train the model for future comparison to improve the identification and division of other audio data.

The audio data may comprise a first portion of the audio data associated with the first user and a second portion of the audio data associated with the second user. At least part of the first portion of the audio data may be removed, leaving altered audio data. The audio data may be divided into a plurality of sections. Dividing the audio data into a plurality of sections may comprise dividing the second portion of the audio data into a plurality of sections. Dividing the second portion of the audio data into a plurality of sections may comprise applying a sliding window to the second portion of the audio data. The sliding window may be based on an average sentence length within a threshold time of the second portion of the audio data.

As further shown in FIG. 9, process 900 may include determining that a threat threshold has been satisfied, at 904. Determining that a threat threshold has been satisfied may comprise analyzing the audio data to determine that the threat threshold has been satisfied. Determining that a threat threshold has been satisfied may comprise analyzing the plurality of sections to determine that the threat threshold has been satisfied. The analyzing the plurality of sections to determine that the threat threshold has been satisfied may comprise one or more of: determining a number of pauses in the plurality of sections, determining that a number of pauses in a later occurring section is greater than a number of pauses in an earlier occurring section, determining a number of words in the plurality of sections, determining that a number of words in a later occurring section is greater than a number of words in an earlier occurring section, determining a number of words denoting urgency in the plurality of sections, determining that a number of words denoting urgency in a later occurring section is greater than a number of words denoting urgency in an earlier occurring section, determining a number of filler utterances in the plurality of sections, determining that a first threshold number of the plurality of sections comprises a second threshold number of filler utterances. Determining that a threat threshold has been satisfied may be based on a threat model. Determining that a threat threshold has been satisfied may be based on at least the audible speech of the second user, the ambient audible speech, and a threat pattern recognition. The threat model may be based at least on threat pattern recognition. The threat pattern recognition may be based at least on a comparison of the audible speech of the second user and the ambient audible speech. The threat threshold may be set by one or more threat factors. As an illustrative example, the threat threshold may be any operative metric whereby meeting or exceeding the threat threshold may be interpreted as an indication of the existence of a threat, such as a vishing attempt. The threat threshold may be determined based on various factors such as one or more of duration of pauses in the audible speech of the caller, an increase or decrease in a length of pauses in the audible speech of the caller, a number of words spoken in a confidence time window, an increase or decrease in the number of words spoken in a confidence time window, and filler utterances in the audible speech of the caller. The threat threshold may be determined based on various factors such as decibel changes over time of the audible speech of the caller, decibel changes over time of audible speech of a receiver, detection of personal identifier keyword, detection of mimic identifier, detection of promotion keyword, detection of empathy keywords, or correlation between prior statement and current statement of the caller. The threat threshold may be determined based on a value of one or more of a confidence stepper, an ambience checker, or an information stepper, as described herein.

The analyzing the audio data to determine that a threat threshold has been satisfied may be based at least in part on a threat model. The threat model may be or comprise a ML model. Other models and rule sets may be used.

The threat model may comprise a confidence stepper, as described herein. The threat pattern recognition may comprise a confidence stepper. As an example, the threat threshold may be based at least on a value of the confidence stepper. The confidence stepper may be based on one or more of duration of pauses in the audible speech of the caller, an increase or decrease in a length of pauses in the audible speech of the caller, a number of words spoken in a confidence time window, an increase or decrease in the number of words spoken in a confidence time window, and filler utterances in the audible speech of the caller. The confidence stepper comprises a sliding confidence time window configured to be adjusted based on at least a comparison of the audio data to a comparative data set, as described herein. The comparative data set may comprise non-threat data. The comparative data set may comprise threat data such as information indicative of a threat pattern or threat behavior.

The threat model may comprise an ambience checker, as described herein. The threat pattern recognition may comprise an ambience checker. As an example, the threat threshold may be based at least on a value of the ambience checker. The ambience checker may be configured to detect ambient information from the audio data and compare the ambient information to the audible speech of the caller to determine that the threat threshold has been satisfied. Ambient information may comprise ambient audible speech.

The threat model may comprise an information flow stepper, as described herein. The threat pattern recognition may comprise an information flow stepper. As an example, the threat threshold is based on a value of the information flow stepper. The information flow stepper may be based on at least a comparison of the audio data to a comparative data set. The comparative data set may comprise non-threat data. The comparative data set may comprise threat data such as information indicative of a threat pattern or threat behavior. The information flow stepper may be based on one or more of decibel changes over time of the audible speech of the caller, decibel changes over time of audible speech of a receiver, detection of personal identifier keyword, detection of mimic identifier, detection of promotion keyword, detection of empathy keywords, or correlation between prior statement and current statement of the caller.

As further shown in FIG. 9, process 900 may include causing, based on determining that the threat threshold has been satisfied, a corrective action, at 906. For example, the user device may cause a corrective action, as described herein. Causing a corrective action may comprise outputting a corrective action. The corrective action may comprise causing a tactile feedback to be provided to the call recipient. The corrective action may comprise causing a visual feedback to be provided to the call recipient. The visual feedback may comprise a flashing light. The corrective action may comprise causing an audio feedback to be provided to the call recipient. The audio feedback may comprise an audible sound. The audio feedback may comprise a dual tone multi frequency (DTMF) tone. The corrective action may comprise causing a notification to be displayed on a device associated with the call recipient. The corrective action may comprise altering the audio data received via the sensor. Altering the audio data may comprise interrupting the audio data from being received by the call recipient. Altering the audio data may comprise adding artificial audio data to the audio data. Altering the audio data may comprise overlaying an inverse audio onto the audio data to mask or interfere with the reception (e.g., ability to understand or hear the altered audio data). Other corrective actions may be used via one or more devices.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Figure 10:
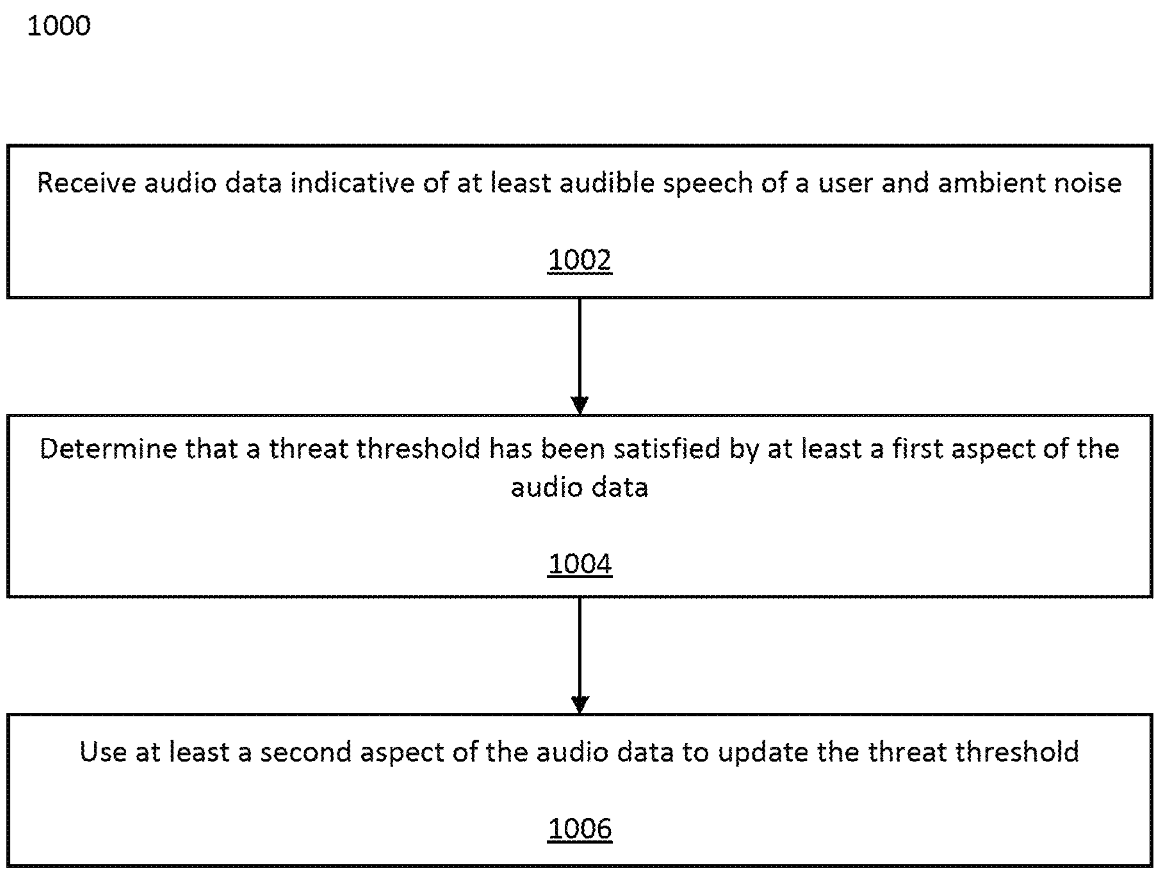
FIG. 10 shows a flowchart of an example method for real-time threat detection.

FIG. 10 is a flowchart of an example process 1000. In some implementations, one or more process blocks of FIG. 10 may be performed by one or more devices.

As shown in FIG. 10, process 1000 may include receiving audio data indicative of at least audible speech of a user and ambient noise, at 1002. The audio data may be received at a computing device. The audio data may be received via a computing device, such as a smart phone, etc. The audio data may be received via a sensor of the computing device, such as a microphone or other component configured to receive or record audio data. For example, a device may receive, via a computing device and/or sensor associated with a first user (call recipient), audio data indicative of at least audible speech of a second user (caller) and ambient noise, as described herein. The ambient noise may comprise ambient audible speech, such as background voices and conversations, for example. The ambient audible speech may comprise any audible speech that is detected that is separate from the audible speech of the second user. Ambient audible speech may comprise contemporaneous conversations in the background such as from a call center or in an environment with several speakers and detectable speech.

Process 1000 may include determining that a threat threshold has been satisfied by at least a first aspect of the audio data, at 1004. The determining that a threat threshold has been satisfied by at least a first aspect of the audio data may comprise analyzing, in real-time and using a threat model, the audio data to determine that the threat threshold has been satisfied by at least the first aspect of the audio data The threat model may be based at least on threat pattern recognition. The threat pattern recognition may be based at least on a comparison of the audible speech of the second user and the ambient audible speech. As further shown in FIG. 10, process 1000 may include using at least a second aspect of the audio data to update the threat threshold, at 1006. As an example, one or more of the first aspect of the audio data or the second aspect of the audio data may be or comprise a presence of multiple languages. One or more of the first aspect of the audio data or the second aspect of the audio data may be or comprise a tone associated with the second user. One or more of the first aspect of the audio data or the second aspect of the audio data may be or comprise s a presence of background noise. One or more of the first aspect of the audio data or the second aspect of the audio data may be or comprise matching conversations extracted from background noise. One or more of the first aspect of the audio data or the second aspect of the audio data may be or comprise decibel changes over time of the second user. One or more of the first aspect of the audio data or the second aspect of the audio data may be or comprise decibel changes over time of the first user. One or more of the first aspect of the audio data or the second aspect of the audio data may be or comprise a presence of one or more personal identifier keywords or phrases. One or more of the first aspect of the audio data or the second aspect of the audio data may be or comprise a presence of one or more suspicious keywords or phrases. One or more of the first aspect of the audio data or the second aspect of the audio data may be or comprise a presence of friendly empathetic language. One or more of the first aspect of the audio data or the second aspect of the audio data may be or comprise a determination that the second user is attempting to mimic a person well known to the first user. One or more of the first aspect of the audio data or the second aspect of the audio data may be or comprise a correlation between statements of the second user. One or more of the first aspect of the audio data or the second aspect of the audio data may be or comprise a duration of pauses by the second user. One or more of the first aspect of the audio data or the second aspect of the audio data may be or comprise a usage of filler utterances by the second user. One or more of the first aspect of the audio data or the second aspect of the audio data may be or comprise a speed of speech associated with the caller. One or more of the first aspect of the audio data or the second aspect of the audio data may be or comprise a usage of urgency words by the second user.

As an illustrative example, the update to the threat model may be based on a feedback loop including audio data captured from various interactions. Alternatively or additionally, the threat model may be updated based on other threat models trained on various audio data. Various learning techniques including transfer learning may be implemented to update any number of threat models, which may then be relied upon for analysis of future audio communications, as described herein.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

The present disclosure comprises at least the following examples:

Example A: A method comprising: receiving, via a sensor associated with a first user, audio data indicative of at least audible speech of a second user; analyzing, in real-time and using a threat model, the audio data to determine that a threat threshold has been satisfied, wherein the threat model is based at least on threat pattern recognition; and outputting, based on the determination that the threat threshold has been satisfied, a corrective action.

Example B: The method of Example A, wherein the sensor comprises a microphone.

Example C: The method of Example A or Example B, wherein the threat model comprises a confidence stepper, and wherein the threat threshold is based on a value of the confidence stepper.

Example D: The method of any one of Examples A-C, wherein the confidence stepper is based on one or more of duration of pauses in the audible speech of the second user, an increase or decrease in a length of pauses in the audible speech of the second user, a number of words spoken in a confidence time window, an increase or decrease in the number of words spoken in a confidence time window, and filler utterances in the audible speech of the second user.

Example E: The method of any one of Examples A-D, wherein the confidence stepper comprises a sliding confidence time window configured to be adjusted based on at least a comparison of the audio data to a comparative data set.

Example F: The method of any one of Examples A-E, wherein the comparative data set comprises non-threat data.

Example G: The method of any one of Examples A-F, wherein the comparative data set comprises threat data.

Example H: The method of any one of Examples A-G, wherein the threat model comprises an ambience checker, and wherein the threat threshold is based on a value of the ambience checker.

Example I: The method of any one of Examples A-H, wherein the ambience checker is configured to detect ambient information from the audio data and compare the ambient information to the audible speech of the second user to determine that the threat threshold has been satisfied.

Example J: The method of any one of Examples A-I, wherein the threat model comprises an information flow stepper, and wherein the threat threshold is based on a value of the information flow stepper.

Example K: The method of any one of Examples A-J, wherein the information flow stepper is based on at least a comparison of the audio data to a comparative data set.

Example L: The method of any one of Examples A-K, wherein the comparative data set comprises non-threat data.

Example M: The method of any one of Examples A-L, wherein the comparative data set comprises threat data.

Example N: The method of any one of Examples A-M, wherein the information flow stepper is based on one or more of decibel changes over time of the audible speech of the second user, decibel changes over time of audible speech of a receiver, detection of personal identifier keyword, detection of mimic identifier, detection of promotion keyword, detection of empathy keywords, or correlation between prior statement and current statement of the second user.

Example O: The method of any one of Examples A-N, wherein the threat model comprises one or more machine learning models trained on at least threat data.

Example P: The method of any one of Examples A-O, wherein the corrective action comprises causing a tactile feedback to be provided to the first user.

Example Q: The method of any one of Examples A-P, wherein the corrective action comprises causing a visual feedback to be provided to the first user.

Example R: The method of any one of Examples A-Q, wherein the visual feedback comprises a flashing light.

Example S: The method of any one of Examples A-R, wherein the corrective action comprises causing an audio feedback to be provided to the first user.

Example T: The method of any one of Examples A-S, wherein the audio feedback comprises an audible sound.

Example U: The method of any one of Examples A-T, wherein the audio feedback comprises a dual tone multi frequency (DTMF) tone.

Example V: The method of any one of Examples A-U, wherein the corrective action comprises causing a notification to be displayed on a device associated with the first user.

Example W: The method of any one of Examples A-V, wherein the corrective action comprises altering the audio data received via the sensor.

Example X: The method of any one of Examples A-W, wherein altering the audio data comprises interrupting the audio data from being received by the first user.

Example Y: The method of any one of Examples A-X, wherein altering the audio data comprises adding artificial audio data to the audio data.

Example Z: A method comprising: receiving, via a sensor associated with a first user, audio data indicative of at least audible speech of a second user; dividing the audio data into a plurality of sections; analyzing, in real-time and using a threat model, the plurality of sections to determine that a threat threshold has been satisfied, wherein the threat model is based at least on threat pattern recognition; and outputting, based on analyzing the plurality of sections, a corrective action.

Example AA: The method of Example Z, wherein the audio data comprise a first portion of the audio data associated with the first user and a second portion of the audio data associated with the second user, and further comprising removing at least part of the first portion of the audio data.

Example AB: The method of Example Z or Example AA, wherein dividing the audio data into a plurality of sections comprises dividing the second portion of the audio data into a plurality of sections.

Example AC: The method of any one of Examples Z-AB, wherein dividing the second portion into a plurality of sections comprises applying a sliding window to the second portion of the audio data.

Example AD: The method of any one of Examples Z-AC, wherein the sliding window is based on an average sentence length within a threshold time of the second portion of the audio data.

Example AE: The method of any one of Examples Z-AD, wherein the sliding window increases over a time associated with the audio data.

Example AF: The method of any one of Examples Z-AE, wherein analyzing the plurality of sections to determine that a threat threshold has been satisfied comprises determining a number of pauses in the plurality of sections.

Example AG: The method of any one of Examples Z-AF, wherein analyzing the plurality of sections to determine that a threat threshold has been satisfied comprises determining that a number of pauses in a later occurring section is greater than a number of pauses in an earlier occurring section.

Example AH: The method of any one of Examples Z-AG, wherein analyzing the plurality of sections to determine that a threat threshold has been satisfied comprises determining a number of words in the plurality of sections.

Example AI: The method of any one of Examples Z-AH, wherein analyzing the plurality of sections to determine that a threat threshold has been satisfied comprises determining that a number of words in a later occurring section is greater than a number of words in an earlier occurring section.

Example AJ: The method of any one of Examples Z-AI, wherein analyzing the plurality of sections to determine that a threat threshold has been satified comprises determining a number of words denoting urgency in the plurality of sections.

Example AK: The method of any one of Examples Z-AJ, wherein analyzing the plurality of sections to determine that a threat threshold has been satisfied comprises determining that a number of words denoting urgency in a later occurring section is greater than a number of words denoting urgency in an earlier occurring section.

Example AL: The method of any one of Examples Z-AK, wherein analyzing the plurality of sections to determine that a threat threshold has been satisfied comprises determining a number of filler utterances in the plurality of sections.

Example AM: The method of any one of Examples Z-AL, wherein analyzing the plurality of sections to determine that a threat threshold has been satisfied comprises determining that a first threshold number of the plurality of sections comprises a second threshold number of filler utterances.

Example AN: The method of any one of Examples Z-AM, wherein outputting corrective action comprises interacting with a device associated with the first user.

Example AO: The method of any one of Examples Z-AN, wherein interacting with the device comprises causing the device to vibrate.

Example AP: The method of any one of Examples Z-AO, wherein interacting with the device comprises causing a light associated with the device to turn on.

Example AQ: The method of any one of Examples Z-AP, wherein interacting with the device comprises causing a light associated with the device to blink.

Example AR: The method of any one of Examples Z-AQ, wherein interacting with the device comprises causing the device to make a noise.

Example AS: The method of any one of Examples Z-AR, wherein the noise is an alarm.

Example AT: The method of any one of Examples Z-AS, wherein the noise is a dual tone multi frequency (DTMF) tone.

Example AU: The method of any one of Examples Z-AT, wherein interacting with the device comprises causing a notification to be pushed to the device.

Example AV: The method of any one of Examples Z-AU, wherein interacting with the device comprises causing a warning to be displayed on a screen associated with the device.

Example AW: The method of any one of Examples Z-AV, wherein interacting with the device comprises causing a message to be delivered to an account associated with the device.

Example AX: The method of any one of Examples Z-AW, wherein the account is associated with a phone number, and the message is delivered via a phone call.

Example AY: The method of any one of Examples Z-AX, wherein the account is associated with a phone number, and the message is delivered via a text message.

Example AZ: The method of any one of Examples Z-AY, wherein the account is associated with an email address, and the message is delivered via an email message.

Example AAA: The method of any one of Examples Z-AZ, wherein the account is associated with a social media account, and the message is delivered via a direct message.

Example AAB: The method of any one of Examples Z-AAA, wherein interacting with the device comprises altering incoming audio data received from the sensor prior to delivery of the incoming audio data to the second user.

Example AAC: The method of any one of Examples Z-AAB, wherein altering the incoming audio data comprises removing the incoming audio data.

Example AAD: The method of any one of Examples Z-AAC, wherein altering the incoming audio data comprises adding artificial audio data to the incoming audio data such that the incoming audio data is rendered unintelligible.

Example AAE: The method of any one of Examples Z-AAD, wherein outputting corrective action comprises interacting with a device associated with the second user.

Example AAF: The method of any one of Examples Z-AAE, wherein interacting with the device comprises causing a speaker associated with the device to be disabled.

Example AAG: The method of any one of Examples Z-AAF, wherein interacting with the device comprises causing a speaker associated with the device to play disruptive audio.

Example AAH: The method of any one of Examples Z-AAG, wherein interacting with the device comprises causing the device to transmit identifying information associated with the device.

Example AAI: The method of any one of Examples Z-AAH, wherein the identifying information comprises a media access control (MAC) address.

Example AAJ: The method of any one of Examples Z-AAI, wherein the identifying information comprises an Internet Protocol (IP) address.

Example AAK: The method of any one of Examples Z-AAJ, wherein outputting corrective action comprises causing a communication channel between the first user and the second user to be terminated.

Example AAL: The method of any one of Examples Z-AAK, wherein the sensor comprises a microphone.

Example AAM: The method of any one of Examples Z-AAL, wherein the threat model comprises a confidence stepper, and wherein the threat threshold is based on a value of the confidence stepper.

Example AAN: The method of any one of Examples Z-AAM, wherein the confidence stepper is based on one or more of duration of pauses in the audible speech of the second user, an increase or decrease in a length of pauses in the audible speech of the second user, a number of words spoken in a confidence time window, an increase or decrease in the number of words spoken in a confidence time window, and filler utterances in the audible speech of the second user.

Example AAO: The method of any one of Examples Z-AAN, wherein the confidence stepper comprises a sliding confidence time window configured to be adjusted based on at least a comparison of the audio data to a comparative data set and wherein the sliding confidence time window is applied to the plurality of sections.

Example AAP: The method of any one of Examples Z-AAO, wherein the comparative data set comprises non-threat data.

Example AAQ: The method of any one of Examples Z-AAP, wherein the comparative data set comprises threat data.

Example AAR: The method of any one of Examples Z-AAQ, wherein the threat model comprises an ambience checker, and wherein the threat threshold is based on a value of the ambience checker.

Example AAS: The method of any one of Examples Z-AAR, wherein the ambience checker is configured to detect ambient information from the audio data and compare the ambient information to the audible speech of the second user to determine that the threat threshold has been satisfied.

Example AAT: The method of any one of Examples Z-AAS, wherein the threat model comprises an information flow stepper, and wherein the threat threshold is based on a value of the information flow stepper.

Example AAU: The method of any one of Examples Z-AAT, wherein the information flow stepper is based on at least a comparison of the audio data to a comparative data set.

Example AAV: The method of any one of Examples Z-AAU, wherein the comparative data set comprises non-threat data.

Example AAW: The method of any one of Examples Z-AAV, wherein the comparative data set comprises threat data.

Example AAX: The method of any one of Examples Z-AAW, wherein the information flow stepper is based on one or more of decibel changes over time of the audible speech of the second user, decibel changes over time of audible speech of a receiver, detection of personal identifier keyword, detection of mimic identifier, detection of promotion keyword, detection of empathy keywords, or correlation between prior statement and current statement of the second user.

Example AAY: The method of any one of Examples Z-AAX, wherein the threat model comprises one or more machine learning models trained on at least threat data.

Example AAZ: The method of any one of Examples Z-AAY, wherein the threat pattern is consistent with a vishing call.

Example AAAA: A method comprising: receiving, via a sensor associated with a first user, audio data indicative of at least audible speech of a second user; analyzing, in real-time and using a threat model, the audio data to determine that a threat threshold has been satisfied by at least a first aspect of the audio data, wherein the threat model is based at least on threat pattern recognition; and using at least a second aspect of the audio data to update the threat model.

Example AAAB: The method of Example AAAA, wherein one of the first aspect and the second aspect is a presence of multiple languages.

Example AAAC: The method of Example AAAA or Example AAAB, wherein one of the first aspect and the second aspect is a change in a tone associated with the second user.

Example AAAD: The method of any one of Examples AAAA-AAAC, wherein one of the first aspect and the second aspect is a presence of background noise.

Example AAAE: The method of any one of Examples AAAA-AAAD, wherein one of the first aspect and the second aspect is matching conversations extracted from background noise.

Example AAAF: The method of any one of Examples AAAA-AAAE, wherein one of the first aspect and the second aspect is decibel changes over time of the second user.

Example AAAG: The method of any one of Examples AAAA-AAAF, wherein one of the first aspect and the second aspect is decibel changes over time of the first user.

Example AAAH: The method of any one of Examples AAAA-AAAG, wherein one of the first aspect and the second aspect is a presence of one or more personal identifier keywords or phrases.

Example AAAI: The method of any one of Examples AAAA-AAAH, wherein one of the first aspect and the second aspect is a presence of one or more suspicious keywords or phrases.

Example AAAJ: The method of any one of Examples AAAA-AAAI, wherein one of the first aspect and the second aspect is a presence of friendly empathetic language.

Example AAAK: The method of any one of Examples AAAA-AAAJ, wherein one of the first aspect and the second aspect is a determination that the second user is attempting to mimic a person well known to the first user.

Example AAAL: The method of any one of Examples AAAA-AAAK, wherein one of the first aspect and the second aspect is a correlation between statements of the second user.

Example AAAM: The method of any one of Examples AAAA-AAAL, wherein one of the first aspect and the second aspect is a duration of pauses by the second user.

Example AAAN: The method of any one of Examples AAAA-AAAM, wherein one of the first aspect and the second aspect is a usage of filler utterances by the second user.

Example AAAO: The method of any one of Examples AAAA-AAAN, wherein one of the first aspect and the second aspect is a speed of speech associated with a user.

Example AAAP: The method of any one of Examples AAAA-AAAO, wherein one of the first aspect and the second aspect is a usage of urgency words by the second user.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware may be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:

receiving, via a computing device associated with a first user, audio data comprising at least audible speech of a second user and ambient noise, wherein the ambient noise comprises ambient audible speech;

determining, based on a comparison of the audible speech of the second user and the ambient audible speech, that a threat threshold has been satisfied; and outputting, based on the determination that the threat threshold has been satisfied, an indication of malicious activity.

2. The method of claim 1, wherein the computing device comprises a microphone.

3. The method of claim 1, wherein the determining that a threat threshold has been satisfied comprises a confidence stepper, and wherein the threat threshold is based on a value of the confidence stepper.

4. The method of claim 3, wherein the confidence stepper is based on one or more of duration of pauses in the audible speech of the second user, an increase or decrease in a length of pauses in the audible speech of the second user, a number of words spoken in a confidence time window, an increase or decrease in the number of words spoken in a confidence time window, and filler utterances in the audible speech of the second user.

5. The method of claim 3, wherein the confidence stepper comprises a sliding confidence time window configured to be adjusted based on at least a comparison of the audio data to a comparative data set.

6. The method of claim 5, wherein the comparative data set comprises one or more of non-threat data and threat data.

7. The method of claim 1, wherein the determining that a threat threshold has been satisfied comprises an information flow stepper, and wherein the threat threshold is based on a value of the information flow stepper.

8. The method of claim 7, wherein the information flow stepper is based on at least a comparison of the audio data to a comparative data set.

9. The method of claim 8, wherein the comparative data set comprises one or more non-threat data and threat data.

10. The method of claim 7, wherein the information flow stepper is based on one or more of decibel changes over time of the audible speech of the second user, decibel changes over time of audible speech of a receiver, detection of personal identifier keyword, detection of mimic identifier, detection of promotion keyword, detection of empathy keywords, or correlation between prior statement and current statement of the second user.

11. The method of claim 1, wherein the determining that a threat threshold has been satisfied comprises accessing one or more machine learning models trained on at least threat data.

12. The method of claim 1, further comprising one or more of: causing a tactile feedback to be provided to the first user, causing a visual feedback to be provided to the first user, causing an audio feedback to be provided to the first user, causing modification of the audio data, or causing a notification to be displayed on a device associated with the first user.

13. A method comprising:

receiving, via a computing device associated with a first user, audio data comprising at least audible speech of a second user and ambient noise, wherein the ambient noise comprises ambient audible speech;

determining, based on at least the audible speech of the second user, the ambient audible speech, and a threat pattern recognition, that a threat threshold has been satisfied; and causing, based on determining that the threat threshold has been satisfied, a corrective action.

14. The method of claim 13, wherein the threat pattern recognition comprises a confidence stepper, and wherein the threat threshold is based on a value of the confidence stepper.

15. The method of claim 14, wherein the confidence stepper is based on one or more of duration of pauses in the audible speech of the second user, an increase or decrease in a length of pauses in the audible speech of the second user, a number of words spoken in a confidence time window, an increase or decrease in the number of words spoken in a confidence time window, and filler utterances in the audible speech of the second user.

16. The method of claim 14, wherein the confidence stepper comprises a sliding confidence time window configured to be adjusted based on at least a comparison of the audio data to a comparative data set.

17. The method of claim 16, wherein the comparative data set comprises one or more of non-threat data and threat data.

18. The method of claim 13, wherein the threat pattern recognition comprises an information flow stepper, and wherein the threat threshold is based on a value of the information flow stepper.

19. The method of claim 18, wherein the information flow stepper is based on at least a comparison of the audio data to a comparative data set.

20. The method of claim 19, wherein the comparative data set comprises one or more non-threat data and threat data.

21. The method of claim 18, wherein the information flow stepper is based on one or more of decibel changes over time of the audible speech of the second user, decibel changes over time of audible speech of a receiver, detection of personal identifier keyword, detection of mimic identifier, detection of promotion keyword, detection of empathy keywords, or correlation between prior statement and current statement of the second user.

22. The method of claim 13, wherein the threat pattern recognition comprises one or more machine learning models trained on at least threat data.

23. The method of claim 13, wherein causing a corrective action comprises one or more of: causing a tactile feedback to be provided to the first user, causing a visual feedback to be provided to the first user, causing an audio feedback to be provided to the first user, causing modification of the audio data, or causing a notification to be displayed on a device associated with the first user.

24. The method of claim 13, wherein causing corrective action comprises one or more of: causing a device associated with the first user to vibrate, causing a light associated with a device associated with the first user to illuminate, causing a light associated with a device associated with the first user to illuminate intermittently, or causing a device associated with the first user to emit an audio tone.

25. A method comprising:

receiving, via a computing device associated with a first user, audio data comprising at least audible speech of a second user and ambient noise, wherein the ambient noise comprises ambient audible speech;

determining, based on a comparison of the audible speech of the second user and the ambient audible speech, that a threat threshold has been satisfied by at least a first aspect of the audio data; and using at least a second aspect of the audio data to update the threat threshold.

26. The method of claim 25, wherein one of the first aspect of the audio data and the second aspect of the audio data comprises one or more of: a presence of multiple languages, a tone associated with the second user, a presence of background noise, matching conversations extracted from background noise, decibel changes over time of an audio associated with the second user, decibel changes over time of an audio associated with the first user, a presence of one or more personal identifier keywords or phrases, a presence of one or more suspicious keywords or phrases, a presence of friendly empathetic language, a duration of pauses by the second user, a usage of filler utterances by the second user, a speed of speech associated with a user, or a usage of urgency words by the second user.

27. The method of claim 13, wherein the first user and the second user are in a same location, and wherein the audible speech of the second user is detected by a microphone associated with the computing device.

28. The method of claim 1, wherein the determining that the threat threshold has been satisfied comprises comparing the audible speech of the second user in the audio data and the ambient audible speech in the same audio data, and is not based on any other audio data.

* * * * *